United States Patent
Zhu et al.

(10) Patent No.: US 12,140,019 B2
(45) Date of Patent: Nov. 12, 2024

(54) METHODS FOR CHARACTERIZING AND EVALUATING WELL INTEGRITY USING UNSUPERVISED MACHINE LEARNING OF ACOUSTIC DATA

(71) Applicant: SCHLUMBERGER TECHNOLOGY CORPORATION, Sugar Land, TX (US)

(72) Inventors: Lingchen Zhu, Medford, MA (US); Sandip Bose, Brookline, MA (US); Smaine Zeroug, Lexington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1009 days.

(21) Appl. No.: 16/973,059

(22) PCT Filed: Jun. 6, 2019

(86) PCT No.: PCT/US2019/035774
§ 371 (c)(1),
(2) Date: Dec. 8, 2020

(87) PCT Pub. No.: WO2019/236832
PCT Pub. Date: Dec. 12, 2019

(65) Prior Publication Data
US 2021/0270127 A1   Sep. 2, 2021

Related U.S. Application Data

(60) Provisional application No. 62/682,249, filed on Jun. 8, 2018.

(51) Int. Cl.
*E21B 47/107* (2012.01)
*E21B 47/002* (2012.01)
(Continued)

(52) U.S. Cl.
CPC ........ *E21B 47/107* (2020.05); *E21B 47/0025* (2020.05); *E21B 47/005* (2020.05);
(Continued)

(58) Field of Classification Search
CPC .. E21B 47/0025; E21B 47/005; E21B 47/107; G01V 1/48; G01V 1/40;
(Continued)

(56) References Cited

U.S. PATENT DOCUMENTS

| | | |
|---|---|---|
| 10,082,006 B2 * | 9/2018 | Conn ...................... E21B 43/00 |
| 2011/0099136 A1 * | 4/2011 | Barajas ................... G06F 17/18 |
| | | 706/13 |

(Continued)

FOREIGN PATENT DOCUMENTS

| | | | | |
|---|---|---|---|---|
| WO | WO-2016115030 A1 * | 7/2016 | ........... | E21B 47/101 |
| WO | WO-2016187242 A1 * | 11/2016 | ........... | E21B 47/005 |
| WO | 2017151834 A1 | 9/2017 | | |

OTHER PUBLICATIONS

Kawa, Nura. "Agglomerative Hierarchical Clustering." RPubs, Jun. 13, 2017, rpubs.com/nurakawa/284508. (Year: 2017).*

(Continued)

*Primary Examiner* — Yoshihisa Ishizuka
*Assistant Examiner* — Joshua L Forristall
(74) *Attorney, Agent, or Firm* — Jeffrey D. Frantz

(57) ABSTRACT

Methods and systems are provided that characterize and evaluate well integrity of a cased well using unsupervised machine learning of acoustic data. Sonic waveform data for acoustic signals received by the receiver array of a sonic logging tool is collected and processed to determine a high-dimensional representation of the sonic waveform data. The high-dimensional representation is input to an unsupervised machine learning system to determine a low-dimensional representation of the sonic waveform data. A cluster- (Continued)

ing method is applied to the low-dimensional representation to identify a set of clusters therein. At least one well integrity property of the depth interval of the cased well is determined based on the set of clusters. In embodiments, the at least one well integrity property can characterize cement condition in an annulus of the cased well as a function of azimuth and depth and can be used to evaluate cement integrity in a depth interval of the cased well.

19 Claims, 21 Drawing Sheets

(51) Int. Cl.
 *E21B 47/005* (2012.01)
 *G01V 1/48* (2006.01)
 *G06N 3/045* (2023.01)
 *G06N 3/047* (2023.01)
 *G06N 3/08* (2023.01)
(52) U.S. Cl.
 CPC .............. *G01V 1/48* (2013.01); *G06N 3/045* (2023.01); *G06N 3/047* (2023.01); *G06N 3/08* (2013.01)
(58) Field of Classification Search
 CPC .......... G06N 3/08; G06N 20/00; G06N 3/045; G06N 3/047
 USPC ........................................................... 702/6
 See application file for complete search history.

(56) References Cited

U.S. PATENT DOCUMENTS

| | | | |
|---|---|---|---|
| 2015/0198032 A1* | 7/2015 | Sinha | E21B 47/107 166/250.01 |
| 2016/0194947 A1 | 7/2016 | Suparman et al. | |
| 2017/0058666 A1 | 3/2017 | Chen et al. | |
| 2018/0010443 A1 | 1/2018 | Lu et al. | |
| 2018/0041985 A1* | 2/2018 | Davaadorj | H04W 64/003 |
| 2018/0149019 A1 | 5/2018 | Bose | |
| 2019/0018161 A1* | 1/2019 | Wang | G01V 1/46 |
| 2019/0347567 A1* | 11/2019 | Njie | G06N 3/04 |
| 2019/0383130 A1* | 12/2019 | Fox | G01V 1/40 |

OTHER PUBLICATIONS

Mishra, Sanatan. "Unsupervised Learning and Data Clustering." Medium, Towards Data Science, May 21, 2017, towardsdatascience.com/unsupervised-learning-and-data-clustering-eeecb78b422a. (Year: 2017).*

Pang, Kevin. "Self-Organizing Maps." HMC.Edu, 2003, www.cs.hmc.edu/~kpang/nn/som.html. (Year: 2003).*

Piech, Chris. "K Means." CS221, 2013, stanford.edu/~cpiech/cs221/handouts/kmeans.html. (Year: 2013).*

Office Action issued in Brazil Patent Application No. BR112020025041-4 dated Jun. 30, 2023, 6 pages with English translation.

Ekstrom, M. P., "Dispersion Estimation from Borehole Acoustic Arrays Using a Modified Matrix Pencil Algorithm," Conference Record of The Twenty-Ninth Asilomar Conference on Signals, Systems and Computers, 1995, vol. 1, pp. 449-453.

Haldorsen, J. B. U. et al., "Borehole Acoustic Waves," Haldorsen et al.; Schlumberger Oilfield Review, pp. 34-43, (Spring 2006).

Hua, Y. et al., "Matrix Pencil Method for Estimating Parameters of Exponentially Damped/Undamped Sinusoids in Noise," IEEE Transactions on Acoustics, Speech, and Signal Processing, 1990, 38(5) pp. 814-824.

Kohonen, T., "Self-organized formation of topologically correct feature maps," Biological Cybernetics, 1982, 43, pp. 59-69.

Ultsch, A. et al., "Kohonen's Self Organizing Feature Maps for Exploratory Data Analysis," in Proceedings of the International Neural Network Conference (INNC-90), Paris, France, 1990, pp. 305-308.

Bengio, Y., "Learning Deep Architectures for AI", Foundations and Trends in Machine Learning, 2009, 2(1), pp. 1-127.

Kingma, D. P. et al., "Auto-Encoding Variational Bayes," in The International Conference on Learning Representations (ICLR), Banff, Canada, 2014, pp. 1-14.

Van Der Maaten, L. et al., "Visualizing Data using t-SNE," Journal of Machine Learning Research, Nov. 9, 2008, pp. 2579-2605.

International Search Report and Written Opinion of International Patent Application No. PCT/US2019/035774 dated Sep. 24, 2019, 12 pages.

International Preliminary Report on Patentability of International Patent Application No. PCT/US2019/035774 dated Dec. 17, 2020, 9 pages.

\* cited by examiner

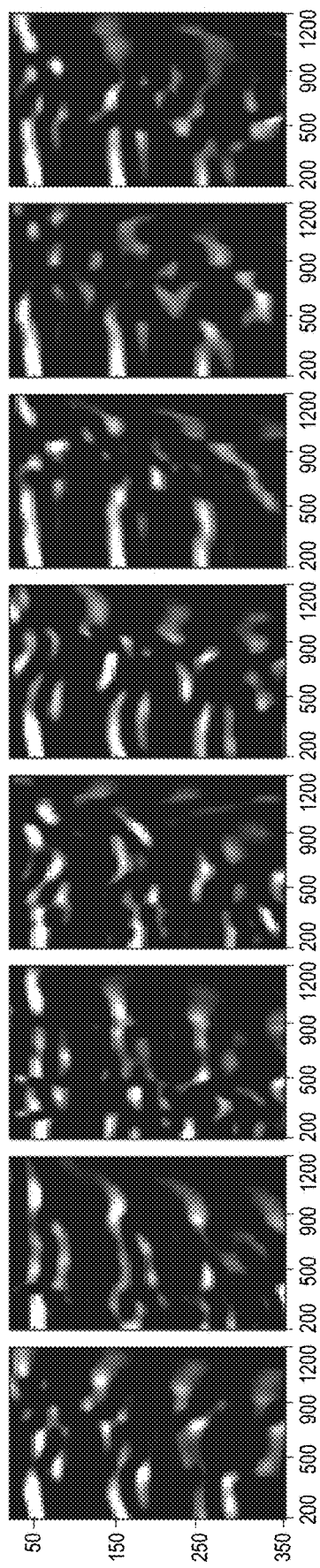

METHODS FOR CHARACTERIZING AND EVALUATING WELL INTEGRITY USING UNSUPERVISED MACHINE LEARNING OF ACOUSTIC DATA

CROSS-REFERENCE TO RELATED APPLICATION

This application is a National Stage Entry of International Application No. PCT/US2019/035774, filed Jun. 6, 2019, which claims the benefit of U.S. Provisional Application No. 62/682,249, filed on Jun. 8, 2018; the contents of which are incorporated herein by reference.

FIELD

This disclosure relates to well logging in oil and gas fields. In particular, this disclosure relates to characterizing and evaluating well integrity using acoustic data.

BACKGROUND

Effective characterization and evaluation of well integrity has become important with the recent advent of tougher governmental regulations that call for oil and gas operators to deliver and maintain wells with competent pressure seals. The goal is to prevent uncontrolled flow of subterranean formation fluids causing leaks to the surface (e.g., atmosphere or sea) or into other formations. The characterization and evaluation of well integrity can be carried out following a cementation job or during the life of a well or at the end of its life before the well is plugged and/or abandoned.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, a method for characterizing well integrity of a cased well is described. The method includes: i) collecting sonic waveform data for acoustic signals received by a receiver array of a sonic logging tool for a depth interval of the cased well; ii) determining a high-dimensional representation of the sonic waveform data collected in i); iii) inputting the high-dimensional representation of ii) into an unsupervised machine learning system to determine a low-dimensional representation of the sonic waveform data; iv) applying a clustering method to the low-dimensional representation of iii) to identify a set of clusters in the low-dimensional representation of iii); and v) determining at least one property related to well integrity of the depth interval of the cased well based on the set of clusters identified in iv).

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIGS. 6A-6H depict STC images derived from sonic waveforms obtained by eight azimuthal receivers in conjunction with bandpass filtering at a center frequency of 20 kHz;

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

Embodiments of the present disclosure are directed to methods and systems that characterize and evaluate well integrity of a cased well using unsupervised machine learning of acoustic data. The methods and systems employ a sonic logging tool that transmits one or more transmitter excitations across a depth interval in a cased well. The transmitter excitations can be monopole, dipole, and/or quadrupole excitations. Sonic waveform data generated by a receiver array of the sonic logging tool in response to the transmitter excitation(s) across the depth interval is collected and processed to determine a high-dimensional representation of the sonic waveform data. The high-dimensional representation of the sonic waveform data is input to an unsupervised machine learning system to determine a low-dimensional representation of the sonic waveform data. A clustering method is applied to the low-dimensional representation to identify a set of clusters in the low-dimensional representation. At least one property related to well integrity of the depth interval of the cased well is determined based on the identified set of clusters.

In embodiments, the at least one property relates to well integrity as a function of azimuth and depth in the cased well. For example, the at least one property can characterize cement condition in an annulus of the cased well as a function of azimuth and depth.

Acoustic measurements performed by acoustic logging tools are widely used to characterize and evaluate well integrity, including the condition of the placed cement in a cased well. Proper well integrity contains and prevents the escape of fluids to subterranean formations or surface by using cementing as part of casing strings. These acoustic measurements typically include sonic (low-frequency) measurements in the signal frequency range from a few hundreds of Hz to 20 kHz.

Figure 1:
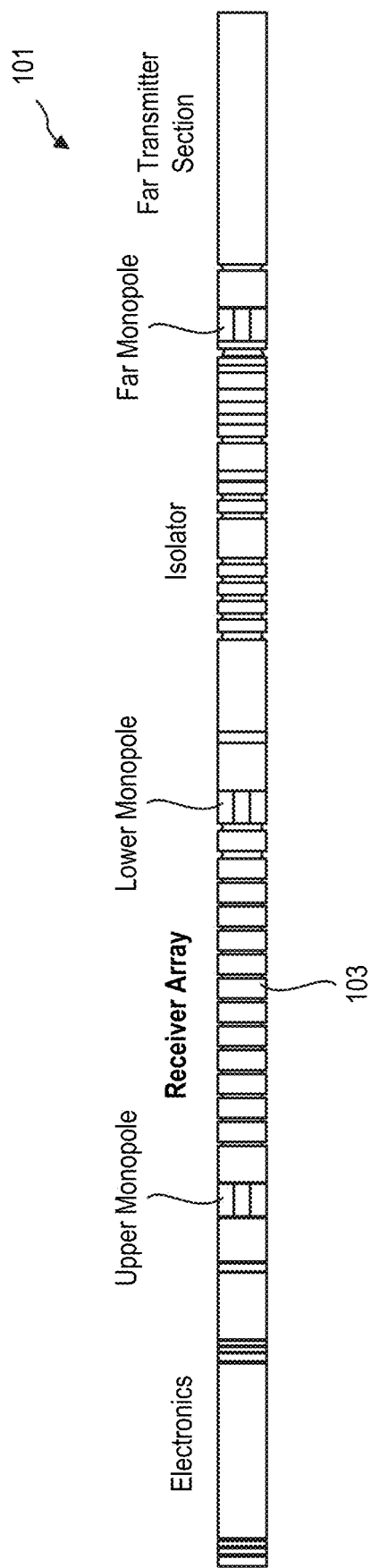
FIG. 1 is a schematic illustration of a sonic logging tool (e.g., SONICSCANNER™ tool)

For example, the SONICSCANNER®, a wireline downhole tool, can be configured to carry out a number of different sonic measurements as a function of azimuth (azimuth direction) and depth (axial depth) in a cased well. Azimuth is typically specified by an azimuth angle between 0 and 360 degrees around the axis of the cased well, which corresponds to the axis of the tool when properly centered. FIG. 1 shows a schematic diagram of the SONIC SCANNER™ tool 101.

Figure 2:
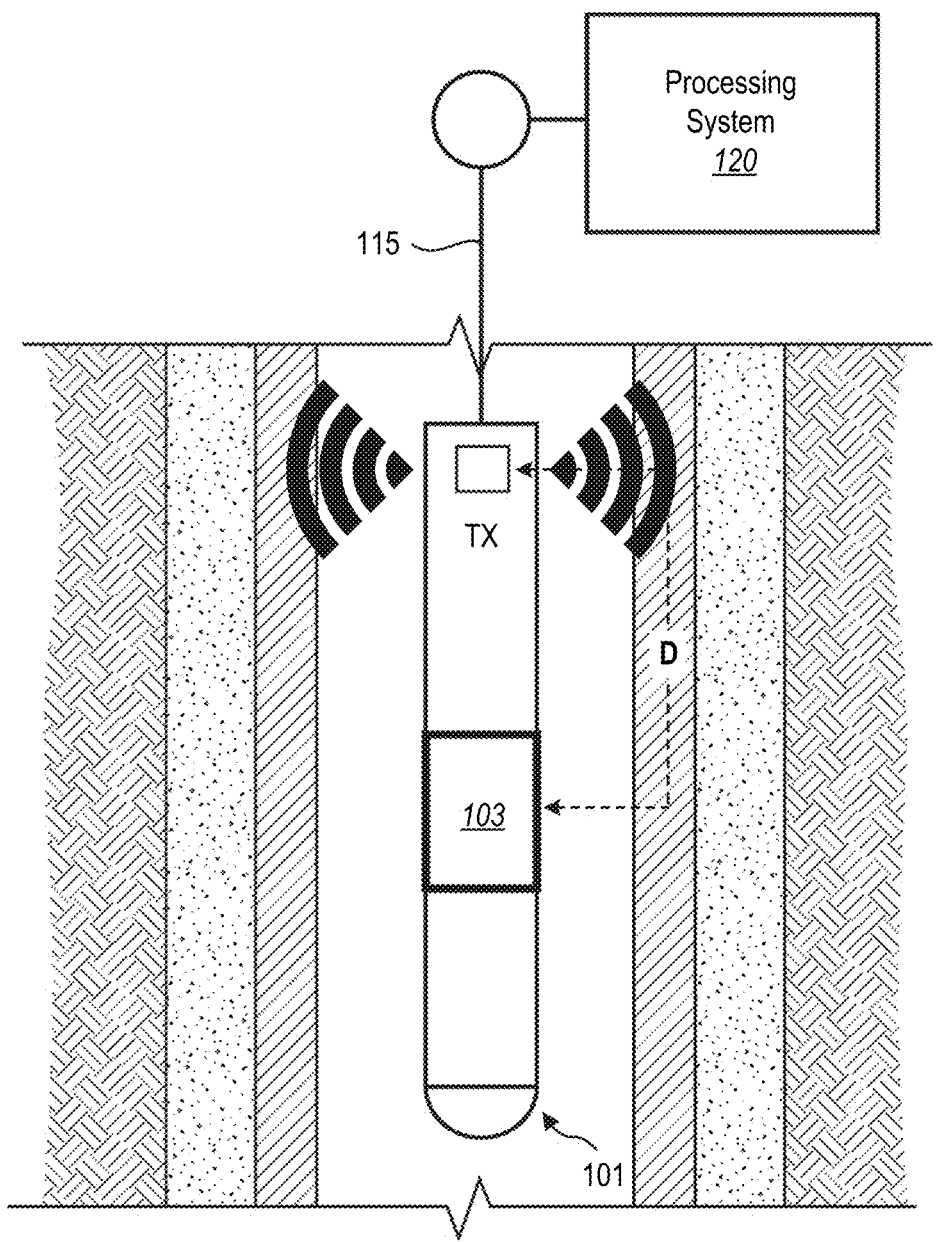
FIG. 2 is a schematic illustration of a sonic logging measurement that can be carried out by the sonic logging tool of FIG. 1.

FIG. 2 shows the SONICSCANNER™ tool 101 in a cased well. The SONICSCANNER' tool includes a multiplicity of transmitters and receivers in an axial and azimuthal array that can be configured to excite and detect multiple borehole modes. These modes include a monopole mode that can be excited both at low and high frequencies and with far and near (with respect to the receiver array) monopole sources, a dipole mode that can be excited at two orthogonal directions yielding cross-dipole excitation, and a quadrupole mode for excitation at four orthogonal directions. The acoustic waveforms or arrivals that are detected by the receiver array of the tool for a depth interval in the cased well can be processed to determine a log of properties related to the cased well environment as a function of azimuth and depth in the cased well. The depth interval for the acoustic waveforms detected by the receiver array of the tool is dependent on the axial position of the tool in the cased well. The near monopole excitation can provide the Cement-Bond-Log (CBL) signal as well as the Variable-Density-Log (VDL) signal, which are measurements available with older-generation cement bond log tools. Typically, the amplitude of the early-arriving part of the CBL signal is correlated to the presence of cement in the annulus with the signal being high whenever there is a lack of cement or a lack of a good cement bond to the casing. The VDL signal can indicate whether formation arrivals are present or not. The presence of formation arrivals can indicate coupling to the formation through cement that is attached to the formation, and vice-versa for their absence.

Figure 3:
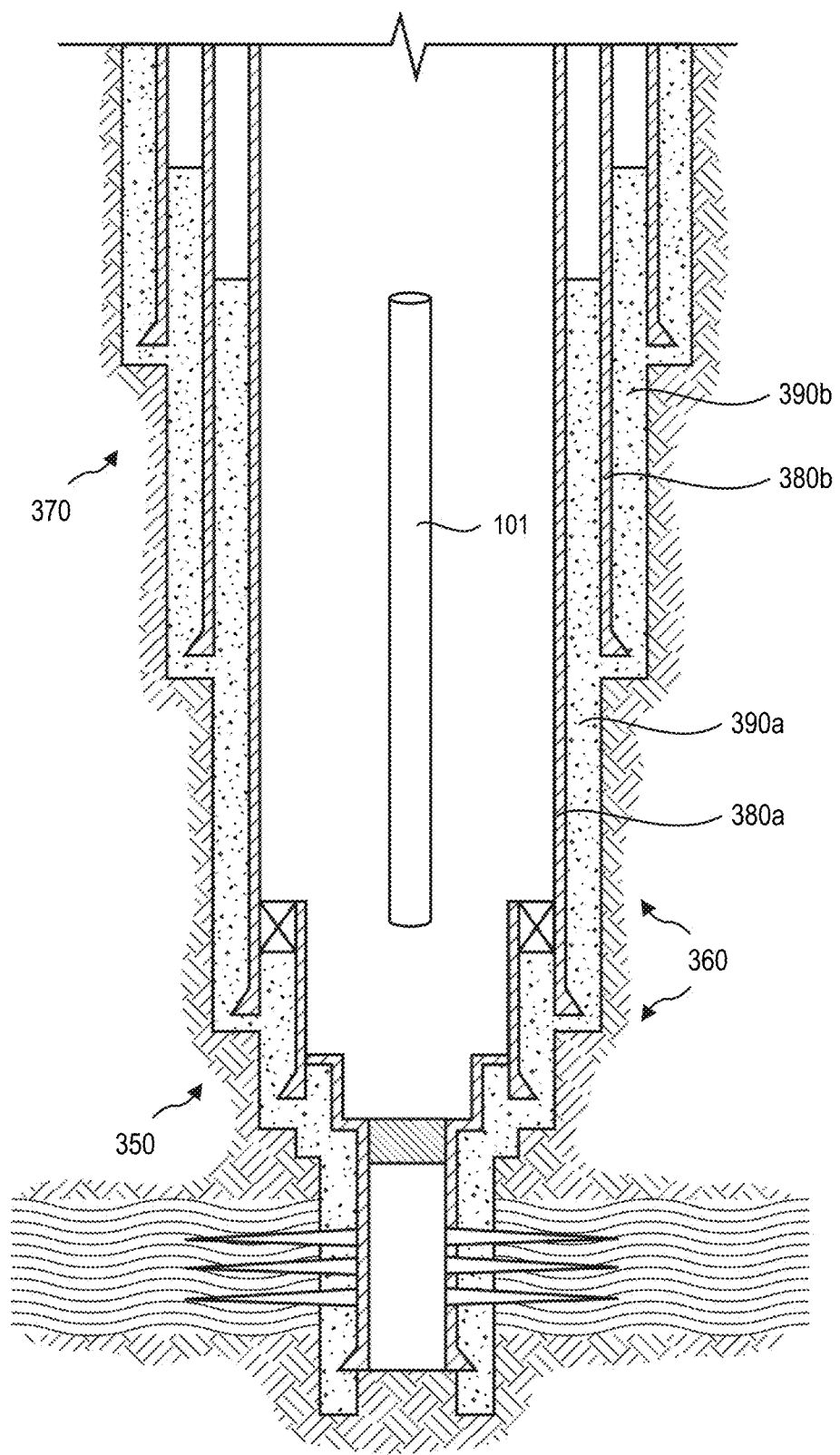
FIG. 3 is a schematic illustration of the sonic logging tool of FIGS. 1 and 2 deployed in a cased well that employs a multiple string casing.

FIG. 3 shows the tool 101 located in a plugged-in well 350 traversing a formation 360. The well 350 is shown to be cased with a multiple string casing 370. As described herein, a multiple string casing employs two or more casings whose lengthwise extents within a well overlap one another for at least part of the lengthwise extents of the two or more casings. Along the lengthwise extents of the overlapping casings, the multiple string casing forms a number of annuli, including an innermost annulus disposed within at least one outer annulus (or outer annuli). The innermost annulus is the annulus between the first and second casings (in the order from the central axis of the well toward the formation). The at least one outer annulus (or outer annuli) is the annulus (annuli) beyond the second casing. For purposes of illustration, a particular segment of the well is shown to have a first casing 380a and a second casing 380b with the first casing 380a surrounded by an annulus 390a and the second casing 380b surrounded by an annulus 390b. For part of its length, annulus 390a is located between casing 380a and the formation 360, and for part of its length, annulus 390a is located between casing 380a and casing 380b. For part of its length, annulus 390b is located between casing 380b and the formation 360. It will be appreciated that the annuli 390a, 390b of FIG. 3 can individually assume various conditions or states (e.g., annulus is hard cement, annulus is lite cement, annulus is water) or other conditions or states that can effect well integrity.

Recently, there are increasing interests in characterizing and evaluating well integrity in cased wells that employ a multiple string casing, such as the multiple string casing of FIG. 3, when plugging and/or abandoning the cased wells. In such applications, the data received from sonic measurements is high-dimensional and often encompasses multiple modalities, and no deterministic inversion method currently exists to automatically interpret the well integrity/cementing properties of the cased well from such data.

In accordance with the present disclosure, an unsupervised machine learning system can be used to provide a data-driven methodology to characterize and evaluate well integrity (including cementing properties for annulus (annuli) of the cased well) from high-dimensional sonic data. Unlike a supervised machine learning system that requires both input signals and labeled output properties as a training set, the unsupervised machine learning system employs high-dimensional sonic data as input without any labels. Furthermore, due to the phenomena of "curse of dimensionality", it is more challenging to apply a clustering algorithm on high-dimensional data than on low-dimensional data. The unsupervised machine learning system can provide a low-dimensional representation of the unlabeled high-dimensional sonic data for clustering and is therefore applicable to much of the sub-surface data with a potential for knowledge discovery and thereby unlock untapped values.

In embodiments, the unsupervised machine learning system can employ one or more of the following: a Self-Organizing Map (SOM) machine learning system, a SOM with Auto-Encoder (SOM-AE) machine learning system, a Variational Auto-Encoder (VAE) machine learning system, and/or a Generative Adversarial Network (GAN) machine learning system. Each one of these four options is based on a neural network and has good generalization ability to produce the low-dimensional representation of the high-dimensional sonic data.

A SOM machine learning system employs a two-layer neural network that is trained using a competitive learning method (which is a form of unsupervised learning) to produce a no-more-than-three dimensional and discretized representation map of high-dimensional input data. Each network neuron of the two-layer neural network with no more than three coordinates is fully connected to the input layer whose number of neurons is the same as that of the input dimension, and no neurons are connected to each other. Once the SOM machine learning system is trained using the input data, the weight vectors of all neurons constitute a codebook. The Euclidean distance between the codebook vectors of neighboring neurons approximates the topological structure of the input data, i.e., data samples that are near each other in the high-dimensional input space are mapped to nearby SOM neurons, and therefore, can be used for adaptive clustering. As a powerful tool for result interpretation, a unified distance matrix (U-matrix) can be used to visualize the trained SOM machine learning system by depicting the Euclidean distance between the codebook vectors of neighboring neurons in an image.

A SOM-AE machine learning system extends the SOM machine learning system by reducing the high-dimensionality of the input data to an intermediate dimension with the encoder of an Auto-Encoder (AE), and then feeding the compressed results (intermediate dimension) produced by the encoder part of the AE to a single-layer neural network (same as in the SOM machine learning system). The AE uses a multiple layer neural network structure which has an input layer, an output layer having the same number of neurons as the input layer, and one or more hidden layers connecting them. The AE includes an encoder part as the first half and a decoder part as the second half and they are designed as a bottleneck topology, where the number of neurons in the encoder part decreases, and the number of neurons in the decoder part increases.

A VAE machine learning system differs from other unsupervised learning systems such as SOM and AE because it not only reduces the dimension of the high-dimensional data to a low-dimensional latent variable space, but also can generate unforeseen new samples like the ones in the training set but not exactly the same. Such power relies on its ability of approximately modeling the probability distribution $p(x)$ of the input data space X. However, modeling $p(x)$ given the input high-dimensional space X is difficult due to curse of dimensionality. Instead, one can assume that there exists a latent space Z such that each given input data $x \in X$ is generated by a latent variable $z \in Z$ through a complex projection $f(z)$. Once one can know $p(z)$ and $f(z)$, $p(x)$ can be simply obtained as $p(x)=\int p(x|z)p(z)dz$. The VAE machine learning system assumes $p(z)$ as a normal distribution and learns $f(z)$ from the training data space X via an encoder-decoder structure using a multiple layer neural network similar to AE, yielding the optimal network parameters, and the corresponding latent variables $z$ for further clustering. Moreover, a new sample $x$ can be generated by randomly sampling from the normal distribution $p(z)$ and passing through $p(x|z)$ as a decoder.

A GAN machine learning system employs two neural networks (generative network and discriminative network) that contest with one another in a zero-sum game framework. The generative network generates candidate data distributions while the discriminative network evaluates the candidate data distributions. Typically, the generative network learns to map from a latent space to a data distribution of interest, while the discriminative network distinguishes candidates produced by the generator from the true data distribution. The training objective of the generative network is to increase the error rate of the discriminative network (i.e., "fool" the discriminator network by producing novel candidates that the discriminator thinks are not synthesized are part of the true data distribution).

In embodiments, one or more waveform processing methods can be applied to the sonic waveform data representing acoustic signals received by the receiver array of the sonic logging tool for a range of depth values (or depth interval) in a cased well to derive the high-dimensional input data that is input to the unsupervised machine learning system.

For example, a first waveform processing method referred to as the TKO method or matrix pencil (MP) method can be applied to sonic waveform data representing acoustic signals received by the receiver array of the sonic logging tool for a range of depth values in the cased well to generate data representing a dispersion relation between slowness and frequency in the sonic waveform data. Details of the TKO method are described in M. P. Ekstrom, "Dispersion estimation from borehole acoustic arrays using a modified matrix pencil algorithm," in Conference Record of The Twenty-Ninth Asilomar Conference on Signals, Systems and Computers, Pacific Grove, C A, 1995, and Y. Hua and T. K. Sarkar, "Matrix pencil method for estimating parameters of exponentially damped/undamped sinusoids in noise," IEEE Transactions on Acoustics, Speech, and Signal Processing, vol. 38, no. 5, pp. 814-824, 1990.

In another example, a second waveform processing method referred to as the STC method can be applied to sonic waveform data representing acoustic signals received by the receiver array of the sonic logging tool for a range of depth values in the cased well to derive data representing a slowness-time-coherence (STC) image corresponding to the sonic waveform data. The STC method calculates coherence maps of the received sonic waveforms over time windows and a range of moveout angles. Details of the STC method are described in J. B. Haldorsen, D. L. Johnson, T. Plona, B. Sinha, H.-P. Valero and K. Winkler, "Borehole acoustic waves," Oilfield Review, 2006.

The unsupervised machine learning system determines a low-dimensional representation of the input data directly from the input data itself. The unsupervised machine learning system can be trained with high-dimensional input data (such as TKO data and/or STC images) derived from simulated acoustic waveforms that cover and correspond to different cased well scenarios related to the range of well integrity/cementing properties that can be determined from the workflow. Alternatively or additionally, the unsupervised machine learning system can be trained with high-dimensional input data (such as TKO data and/or STC images) derived from measured acoustic waveforms in different known cased well environments that cover and correspond to the range of well integrity/cementing properties that can be determined from the workflow.

The low-dimensional representation produced by the unsupervised machine learning system can be processed by one or more clustering methods to identify a number of clusters (classes) in the low-dimensional representation and discover identifiers (labels) for the number of clusters directly from the data itself. A cluster is a group or class of data elements in the low-dimensional representation. Properties for characterizing and evaluating well integrity can be determined from the cluster identifiers produced by the clustering method and corresponding sonic data. For example, such properties can be related to cementing of annulus (annuli) in the cased well as function of azimuth and depth.

Workflow

Figure 4:
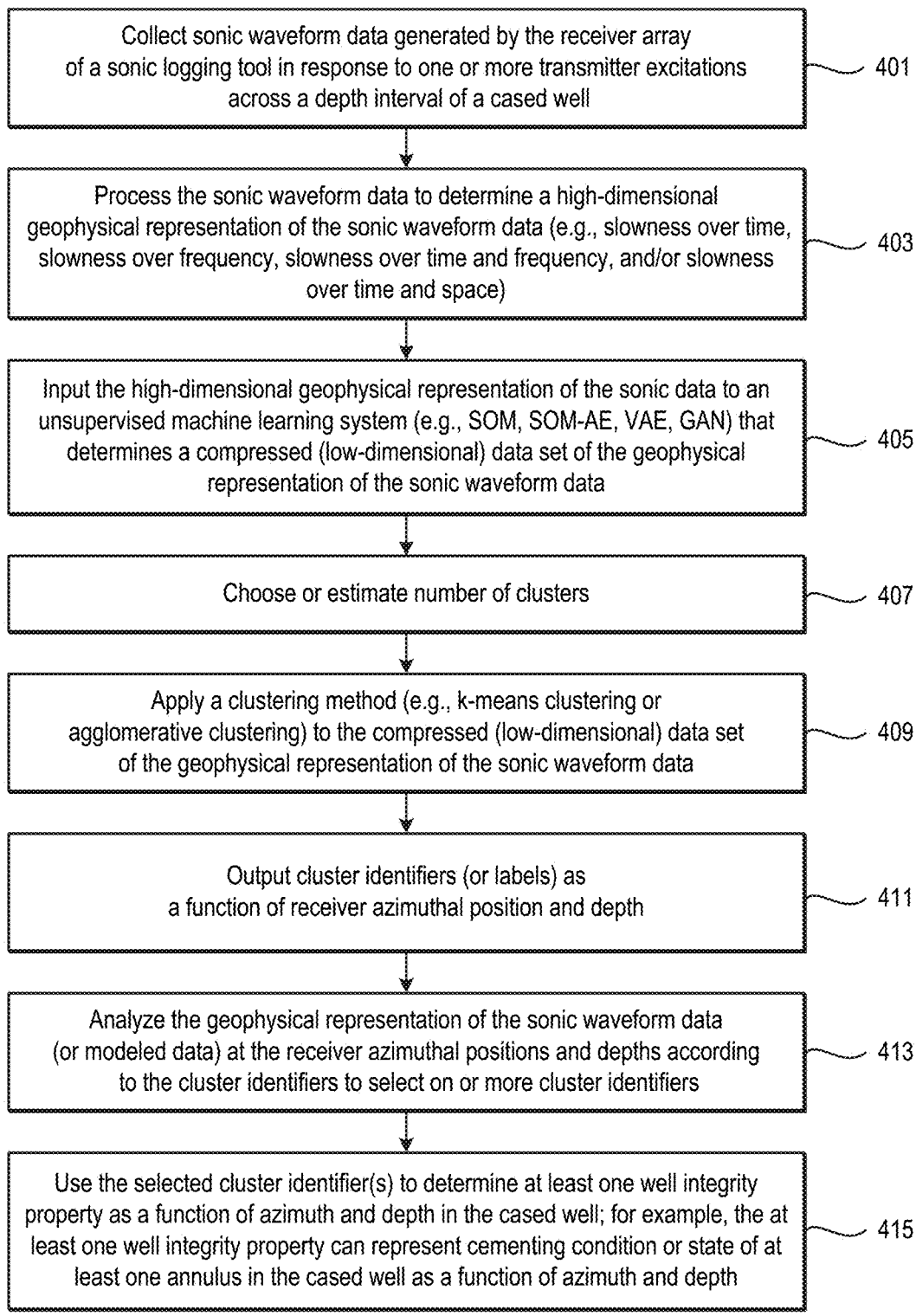
FIG. 4 shows a workflow for characterizing and evaluating well integrity that employs unsupervised machine learning of sonic data acquired by a sonic logging tool; the workflow can determine well integrity properties of the cased well, such as cementing properties of at least one annulus that is part of the cased well.

Turning to FIG. 4, a workflow is presented that collects sonic waveform data representing acoustic signals received by multiple receivers of the receiver array of a sonic logging tool (such as the sonic logging tool of FIG. 1) in response to one or more transmitter excitations across a depth interval in a cased well (block 401). The transmitter excitations can be monopole, dipole, and/or quadrupole excitations. In embodiments, the cased well can have a multiple string casing as shown in FIG. 3. In other embodiments, the cased well can employ other casing configurations.

In block 403, the sonic waveform data collected in block 401 is processed to determine a geophysical representation of the sonic waveform data (e.g., slowness over time, slowness over frequency, slowness over time and frequency, and/or slowness over time and space). In embodiments, the processing of block 403 can employ one or more waveform processing methods (e.g., TKO method and/or STC method) on the collected sonic waveform data to determine the geophysical representation of the sonic waveform data as described herein.

In block 405, the geophysical representation of the sonic waveform data of block 403 is input to an unsupervised machine learning system that determines a compressed (low-dimensional) data set of the geophysical representation of the sonic waveform data. In this operation, the geophysical representation of the sonic waveform data of block 403 is used as high-dimensional input data to the unsupervised machine learning system. The unsupervised machine learning system determines a low-dimensional representation of the input data directly from the input data itself. The unsupervised machine learning system used in block 405 can be trained with high-dimensional input data (such as TKO data and/or STC image data) derived from simulated acoustic waveforms that cover and correspond to different cased well scenarios related to the range of well integrity/cementing properties that can be determined from the workflow. Alternatively or additionally, the unsupervised machine learning system used in block 405 can be trained with high-dimensional input data (such as TKO data and/or STC image data) derived from measured acoustic waveforms in different known cased well environments that cover and correspond to the range of well integrity/cementing properties that can be determined from the workflow.

In block 407, a number of clusters can be chosen or estimated. For example, the number of clusters can be chosen from a predefined value or estimated by data processing.

In block 409, a clustering method (e.g., k-means clustering or agglomerative clustering) can be applied to the compressed (low-dimensional) data set output by the unsupervised learning system in block 405. The clustering method processes the compressed (low-dimensional) data set to identify a set of clusters and corresponding cluster identifiers (or labels) in the compressed (low-dimensional) data set. The number of clusters in the identified set of clusters can be based on the number of clusters as chosen or estimated in block 407.

In block 411, the cluster identifiers (or labels) for the set of clusters identified in block 409 can be output as a function of receiver azimuthal position and depth in the cased well. The cluster identifier (or labels) obtained by a clustering method on the compressed (low-dimensional) data are an originally collapsed one-dimensional vector where the labels of all depth and azimuthal positions are flattened together. By reshaping (rearranging indices of) the one-dimensional vector of label representation to a two-dimensional matrix, a two-dimensional map of labels where one dimension (y-axis, from top to bottom) represents the depth position and the other dimension (x-axis, from left to right) can be obtained.

In block 413, the geophysical representation of the sonic waveform data (or modeled data) at the receiver azimuthal positions and depths of the cluster identifiers output in block 411 can be analyzed to select one or more cluster identifiers identified by the clustering method. Such analysis can involve expert analysis of selected frames corresponding to each one of the cluster/cluster identifiers output in block 411. In a non-limiting example, a frame of sonic data is sonic data at a certain depth. Usually, frame and depth can be used interchangeably. Such analysis can also use modeling to understand and interpret the data from these selected frames.

The number of cluster identifiers selected in block 413 can also be chosen with such analysis. Alternatively, an objective function can be defined and used in the machine learning and clustering operations to estimate and determine the number of clusters and corresponding cluster identifiers selected in block 413.

In block 415, the cluster identifier(s) selected in block 413 can be used to determine at least one well integrity property as a function of azimuth and depth in the cased well. For example, the at least one well integrity property can be related to condition of cement (hard cement or soft cement or presence of water) in at least one annulus of the cased well as a function of azimuth and depth.

Different well integrity/cement properties (hard cement/soft cement/fluid) can change the received sonic waveforms, and then correspondingly change the said sonic data features (e.g., STC, TKO). Hence, their low-dimensional representations have different distributions in the latent space, yielding different cluster labels to its surrounding regions (in the sense of depths and azimuths) after a clustering method.

In a non-limiting example, the entire processed depths and azimuths can be reviewed to understand the overall distribution of the well integrity/cement properties, and/or pick certain regions of depths/azimuths with some particular labels of interest, which might be different from their surrounding regions, to understand quickly that such regions are different from their surroundings, and then experts with domain knowledge can be directed to further investigate other auxiliary measurements acquired/processed from ultrasonic, seismic, electromagnetic devices, etc. for better understanding of the properties.

In embodiments, the at least one property related to well integrity as determined in block 415 can be stored in computer memory and output for display and evaluation of well integrity at the depth interval in the cased well.

In embodiments, the operations of blocks 401 to 415 can be repeated for different depth intervals in the cased well to determine the at least one property related to well integrity for the different depth intervals. In this case, the sonic logging tool can be conveyed within the cased well and located at axial depth positions corresponding to the different depth intervals. At each axial depth position, the sonic logging tool can be operated to collect sonic waveform data for multiple receivers of the receiver array of a sonic logging tool (such as the sonic logging tool of FIG. 1) in response to one or more transmitter excitations across the corresponding depth interval in the cased well. The at least one property related to well integrity as determined in block 415 for the different depth intervals in the cased well can be stored in computer memory and output for display as part of a well log in order to characterize and evaluate well integrity as a function of azimuth and depth in the cased well.

TKO Method

As described above, the TKO method can be applied to sonic waveform data representing acoustic signals received by the receiver array of the tool to derive sonic data characterizing a dispersion relation between slowness and frequency in the sonic waveform data, and such operations can be part of block 403 of FIG. 4. A detailed description follows for an implementation of the TKO method that processes sonic waveforms received by the receiver array of the sonic logging tool in response to acoustic excitations transmitted by a far-monopole transmitter or far-dipole transmitter.

In this implementation, the sonic waveforms received by the receiver array of the sonic logging tool are normalized to the normalization factors of each corresponding receiver in the receiver array. For each depth, we denote the normalized monopole or dipole sonic waveform at the ith axial receiver as $r_i(t)$ after modal decomposition, where $i=1, \ldots, N_Z$, $t \in [0, N_T]$. Since the dispersion relation is expressed in terms of frequency and slowness, the received signals are first transformed to the frequency domain with the Fourier transform as $$R_i(f) = \frac{1}{\sqrt{N_T}} \int r_i(t) e^{-j2\pi ft} dt.$$

At a particular frequency $f_0$, $R_i(f_0)$ can be approximated as a linear combination of p complex wavenumbers in the form of $$R_i(f_0) \approx \sum_{i=1}^{p} a_i e^{-jk_i z}.$$

The matrix pencil method can be used to estimate $k_i$, $i=1, \ldots, P$. In this implementation, two matrices $R^{(0)}$ and $R^{(1)}$ are constructed as:

$$R^{(0)} = \begin{bmatrix} R_2(f_0) & R_3(f_0) & \ldots & R_{P+1}(f_0) \\ R_3(f_0) & R_4(f_0) & & R_{P+2}(f_0) \\ \vdots & & \ddots & \vdots \\ R_{N_Z-P+1}(f_0) & R_{N_Z-P+2}(f_0) & \ldots & R_{N_Z}(f_0) \end{bmatrix}, \text{ and} \quad \text{Eqn. (1a)}$$

$$R^{(1)} = \begin{bmatrix} R_1(f_0) & R_2(f_0) & \ldots & R_P(f_0) \\ R_2(f_0) & R_3(f_0) & & R_{P+1}(f_0) \\ \vdots & & \ddots & \vdots \\ R_{N_Z-P}(f_0) & R_{N_Z-P+1}(f_0) & \ldots & R_{N_Z-1}(f_0) \end{bmatrix}. \quad \text{Eqn. (1b)}$$

The size of $R^{(0)}$ and $R^{(1)}$ is given as $(N_Z-P) \times P$. The matrix pencil algorithm shows that the poles are actually the eigenvalues of the matrix pencil $(R^{(0)}, R^{(1)})$ as described in Y. Hua and T. K. Sarkar, "Matrix pencil method for estimating parameters of exponentially damped/undamped sinusoids in noise," IEEE Transactions on Acoustics, Speech, and Signal Processing, vol. 38, no. 5, pp. 814-824, 1990. This means to solve)

$$|R^{(0)} - \lambda R^{(1)}| = 0, \quad \text{Eqn. (2)}$$

or equivalently, $$|(R^{(1)})^\dagger R^{(0)} - \lambda I| = 0 \quad \text{Eqn. (3)}$$

where $(\bullet)^\dagger$ denotes the pseudo-inverse of a matrix. After the above eigenvalue calculation, the eigenvalues $\lambda$ of length P are called the backward pole estimates.

Similarly, after calculating the eigenvalues of the matrix pencil $(R^{(1)}, R^{(0)})$, i.e., solving $|R^{(1)} - \lambda R^{(0)}| = 0$, the results $\lambda$ of length P are called the forward pole estimates. Then the magnitudes between the forward and backward pole estimates $\lambda$ can be compared to one another and those well-matched poles can be picked as the good pole estimates $\hat{k}$ based on a given threshold of magnitude differences. Then, the corresponding slowness $\hat{s} = \hat{k}/f$ can be estimated with respect to the frequency.

STC Method

As described above, the STC method can be applied to sonic waveform data representing acoustic signals received by the receiver array of the tool to derive sonic data representing a slowness-time-coherence (STC) image corresponding to the sonic waveform data, and such operations can be part of block 403 of FIG. 4. A detailed description follows for an implementation of the STC method that processes sonic waveforms received by the receiver array of the sonic logging tool in response to acoustic excitations transmitted by a far-monopole transmitter or a far-dipole transmitter.

A bandpass filtering process can be performed for each received signal $r_i(t)$ using a continuous wavelet transform, e.g., a continuous wavelet transform using the Morlet wavlet. The Morlet wavelet can be expressed as $$w_{f_c}(t) = e^{j2\pi f_c t} e^{-\frac{t^2}{2\sigma^2}}$$

where $f_c$ is the center frequency, and $\sigma$ is a constant bandwidth. The continuous wavelet transform is a convolution process in the time domain and equivalently it is simply a multiplication process in the frequency domain. The frequency spectrum of $r_i(t)$ and $w_{f_0}(t)$ can be obtained using the Fourier Transform as:

$$R_i(f) = \frac{1}{\sqrt{N_T}} \int r_i(t) e^{-j2\pi f t} dt, \text{ and} \qquad \text{Eqn. (4a)}$$

$$W_{f_c}(f) = \frac{1}{\sqrt{N_T}} \int w_{f_c}(t) e^{-j2\pi f t} dt. \qquad \text{Eqn. (4b)}$$

Therefore, the bandpass filtered signal in the frequency domain is given as:

$$R_{i,f_c}^{(w)}(f) = R_i(f) W_{f_c}(f). \qquad \text{Eqn. (5)}$$

In order to include the slowness information for the STC image, the frequency-domain shift component $S_s(f)=e^{j2\pi f s}$, where $s \in [s_1, \ldots, s_N]$ belongs to a set of interested slowness values, is introduced to shift the bandpass filtered frequency-domain signal $R_{i,f_c}^{(w)}(f)$ to an interested slowness s as $R_{i,f_c}^{(w)}(f)=R_{i,f_c}^{(w)}(f)S_s(f)$. The slowness-shifted bandpass filtered signal is then converted to the time domain with the inverse Fourier Transform as:

$$r_{i,f_c,s}^{(w)}(t) = \frac{1}{\sqrt{N_T}} \int R_{i,f_c,s}^{(w)}(f) e^{j2\pi f t} df. \qquad \text{Eqn. (6)}$$

Finally, the STC image of the signal bandpass filtered at center frequency $f_c$ with respect to the slowness and time is obtained by normalizing the axial domain as:

$$STC_{f_c}(s, t) = (1/R_Z) \left| \sum_i r_{i,f_c,s}^{(w)}(t) \right|^2 / \sum_i \left| r_{i,f_c,s}^{(w)}(t) \right|^2. \qquad \text{Eqn. (7)}$$

Figure 5A:
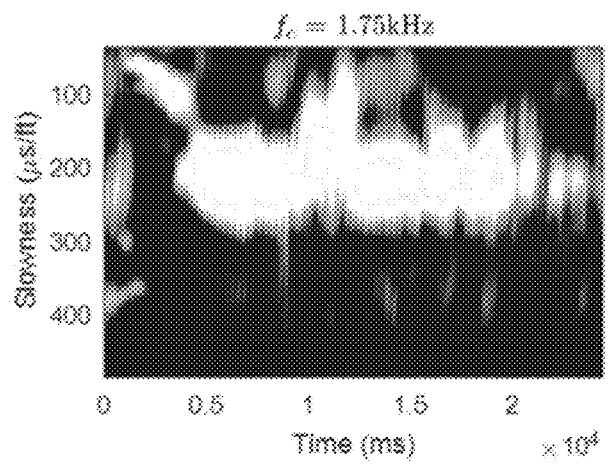
FIGS. 5A-5C are slowness-time-coherence (STC) images derived from sonic waveforms obtained by a single receiver in conjunction with bandpass filtering at different center frequencies.
Figure 5B:
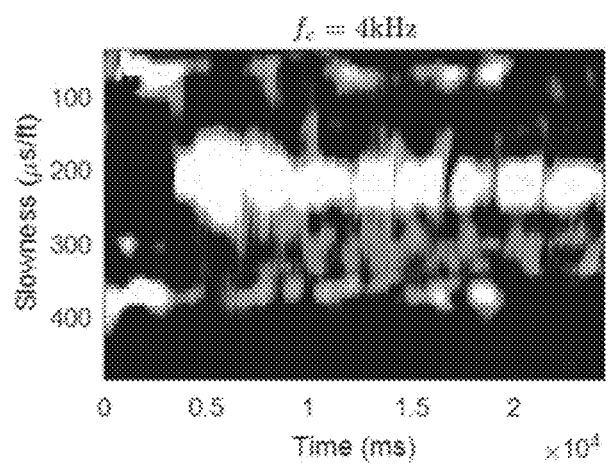
Figure 5C:
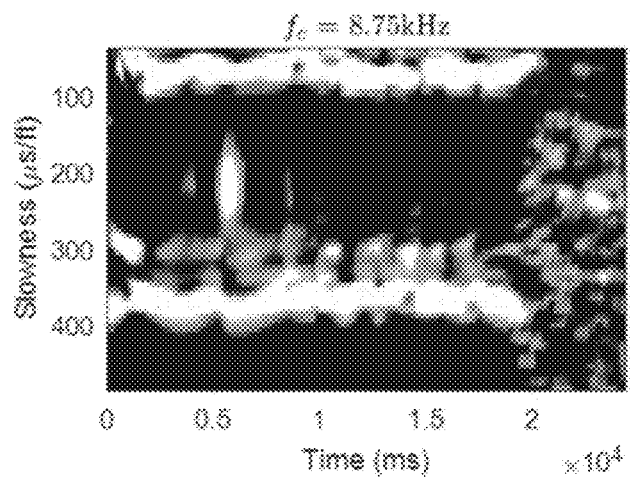

FIGS. 5A-5C demonstrate STC images derived from sonic waveforms received at a single receiver in response to acoustic excitations transmitted by the far-dipole transmitter after modal decomposition and bandpass filtering at three different center frequencies. The STC image of FIG. 5A was derived from the received dipole signal after modal decomposition and bandpass filtering at a center frequency $f_c$ of 1.75 kHz. The STC image of FIG. 5B was derived from the received dipole signal after modal decomposition and bandpass filtering at a center frequency $f_c$ of 4 kHz. The STC image of FIG. 5C was derived from the received dipole signal after modal decomposition and bandpass filtering at a center frequency $f_c$ of 8.75 kHz.

FIGS. 6A-6H demonstrate STC images derived from sonic waveforms received at eight azimuthal receivers in response to acoustic excitations transmitted by the far-monopole transmitter after modal decomposition and bandpass filtering at a center frequency $f_c$ of 20 kHz. The rows of each STC image refer to the slowness axis, and the columns of each STC image refer to the time axis.

As can be seen from the STC images of FIGS. 5A-5C and FIGS. 6A-6H, the different bandpass filtered STC images reveal different modality of the received waveforms, and the different azimuthal STC images indicate azimuthal heterogeneity.

Self-Organizing Map (SOM)

The main objective of a SOM machine learning system is automatic data clustering and graphical presentation of the resulting data clusters. The SOM machine learning system projects the high-dimensional input data as vectors to a space of lower dimension whose size is 2 or 3, and visualizes two- or three-dimensional points in a scatter plot. See T. Kohonen, "Self-organized formation of topologically correct feature maps," Biological Cybernetics, no. 43, pp. 59-69, 1982. Moreover, such a new low-dimensional set of data can preserve the topological structure of the high-dimensional input data. SOM uses a neural network for dimensionality reduction.

Figure 7:
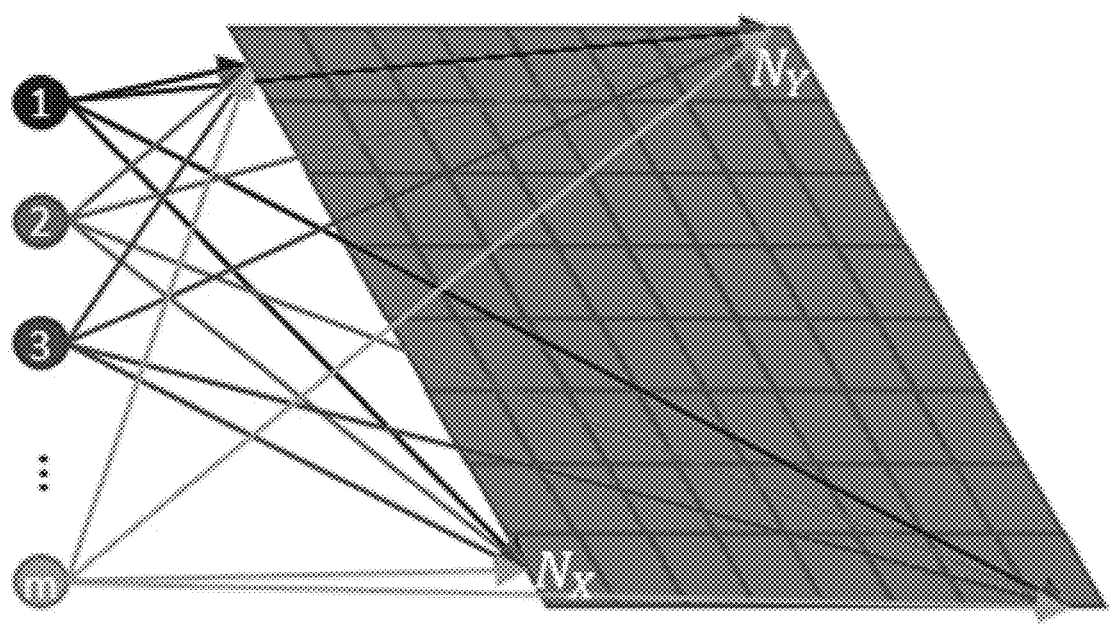
FIG. 7 is a schematic illustration of a neural network structure for a two-dimensional Self-Organizing Map (SOM) machine learning system, which can be used for sonic data compression as part of the workflow of FIG. 4.

FIG. 7 demonstrates the neural network structure for a SOM machine learning system with a two-dimensional structure. Suppose each input data $x=[x_1, \ldots, x_m]$ is a vector of length m, and they set up an input layer of m neurons shown as the circles in the left-hand side of FIG. 7. Furthermore, suppose the SOM machine learning system has $N_X \times N_Y$ neurons in the output layer shown as the blocks in the right-hand-side of FIG. 7. Then, a fully-connected neural network can be established between the two layers. These connections between the input and the output layers have weights and the set of weights for each output node at position (i,j) fully connected to the m input neurons forms a weight vector $w_{ij}=[w_{ij}^{(1)}, \ldots, w_{ij}^{(m)}]$, for $i=1, \ldots N_X$, $j=1, \ldots, N_Y$. The weight vector $w_{ij}$ is also called a codebook vector. All codebook vectors are randomly initialized before the unsupervised learning or training of SOM machine learning system begins.

The SOM machine learning system is trained over one or more training steps. In each training step, suppose there are n input vectors $x_1, \ldots, x_n$, and an input vector $x_p \in \{x_1, \ldots, x_n\}$ is randomly selected and passed to the neural network. The vector $x_p$ is compared with all the codebook vectors $w_{ij}$ and a best matching neuron (BMU) is designated with the minimal Euclidean distance to it, i.e., $$BMU(x_p) = \underset{i,j}{\operatorname{argmin}} \|x_p - w_{ij}\|^2. \qquad \text{Eqn. (8)}$$

After BMUs of all input vectors have been calculated, the training process updates the codebook vectors $w_{ij}$ by:

$$w_{ij}(t+1) = w_{ij}(t) + \eta(t) \cdot T_{ij,BMU(x_p)} \cdot (x_p - w_{ij}), \qquad \text{Eqn. (9)}$$

where t is the number of iterations (epoch), $\eta(t)$ is the time-dependent learning rate, and $T_{ij,BMU(x_p)}$ is a topological neighborhood function in terms of the BMU of $x_p$ and any arbitrary neuron located at position (i, j).

In practice, $$w_{ij}(t+1) = w_{ij}(t) + \eta(t) \cdot T_{ij,BMU(x_p)} \cdot (x_p - w_{ij}), \quad \text{Eqn. (9)}$$

where $S_{ij,BMU(x_p)}$ is the lateral distance between the BMU of $x_p$ and any arbitrary neuron located at position (i,j). $T_{ij,BMU(x_p)}$ has several important properties: it is maximal at $BMU(x_p)$, it is symmetrical about that neuron, it decreases monotonically to zero when the distance goes to infinity, and it has the property of translation invariant, i.e., it is independent of the location of BMU $(x_p)$. The point of $T_{ij,BMU(x_p)}$ is that not only $BMU(x_p)$ gets its weights updated, but its neighbors will have their weights updated as well, although not as much as $BMU(x_p)$ itself. Therefore, the overall effect of each weight update process is to move the weight vector of the BMU of an input $x_p$ and the adjacent neighbors of the BMU towards the input $x_p$. Repeatedly calculating the BMUs and updating the weights preserve the topological structure of the input data.

When the SOM machine learning system has been trained, all the input vectors are passed to the network again to find a set of BMUs. The input vectors are now distributed among the grids of the map. In this manner, the trained SOM machine learning system can be used to transform high-dimensional input data according to the discrete structure of the trained SOM machine learning system. In order to visualize how much the input vectors are close in the space, a method called unified distance matrix (U-matrix) can be used, which shows the distance between the neighboring neurons as follows:

$$U\text{-matrix} = \begin{bmatrix} d_{11} & d_{11|12} & d_{12} & d_{12|13} & & d_{1N_Y} \\ d_{11|21} & d_{11|12|21|22} & d_{12|22} & d_{12|13|22|23} & \cdots & d_{1N_Y|2N_Y} \\ d_{21} & d_{21|22} & d_{22} & d_{22|23} & & d_{2N_Y} \\ & & \vdots & & \ddots & \vdots \\ d_{N_X1} & d_{N_X1|N_X2} & d_{N_X2} & d_{N_X2|N_X3} & \cdots & d_{N_XN_Y} \end{bmatrix}, \quad \text{Eqn. (10)}$$

where $d_{ij|i(j+1)}$, $d_{ij|(i+1)j}$ are the Euclidean distances between the weight vectors $w_{ij}$ and $w_{i(j+1)}$, $w_{ij}$ and $w_{(i+1)j}$, respectively.

The values of $d_{ij|i(j+1)|(i+1)j|(i+1)(j+1)} = (d_{ij} + d_{i(j+1)} + d_{(i+1)j} + d_{(i+1)(j+1)})/4$ and the values of $d_{ij}$ is the average of neighboring elements of the U-matrix. Details of the U-matrix are set forth in A. Ultsch and H. P. Siemon, "Kohonen's Self Organizing Feature Maps for Exploratory Data Analysis," in Proceedings of the International Neural Network Conference (INNC-90), Paris, France, 1990. If the gray colormap is used, the dark color in U-matrix corresponds to a large distance between two neighboring neurons and a light color indicates a close distance between two neighboring neurons. Hence light areas can be thought as clusters and dark areas can be used as cluster separators. Different colormaps other than the gray one can also be used.

Figure 8:
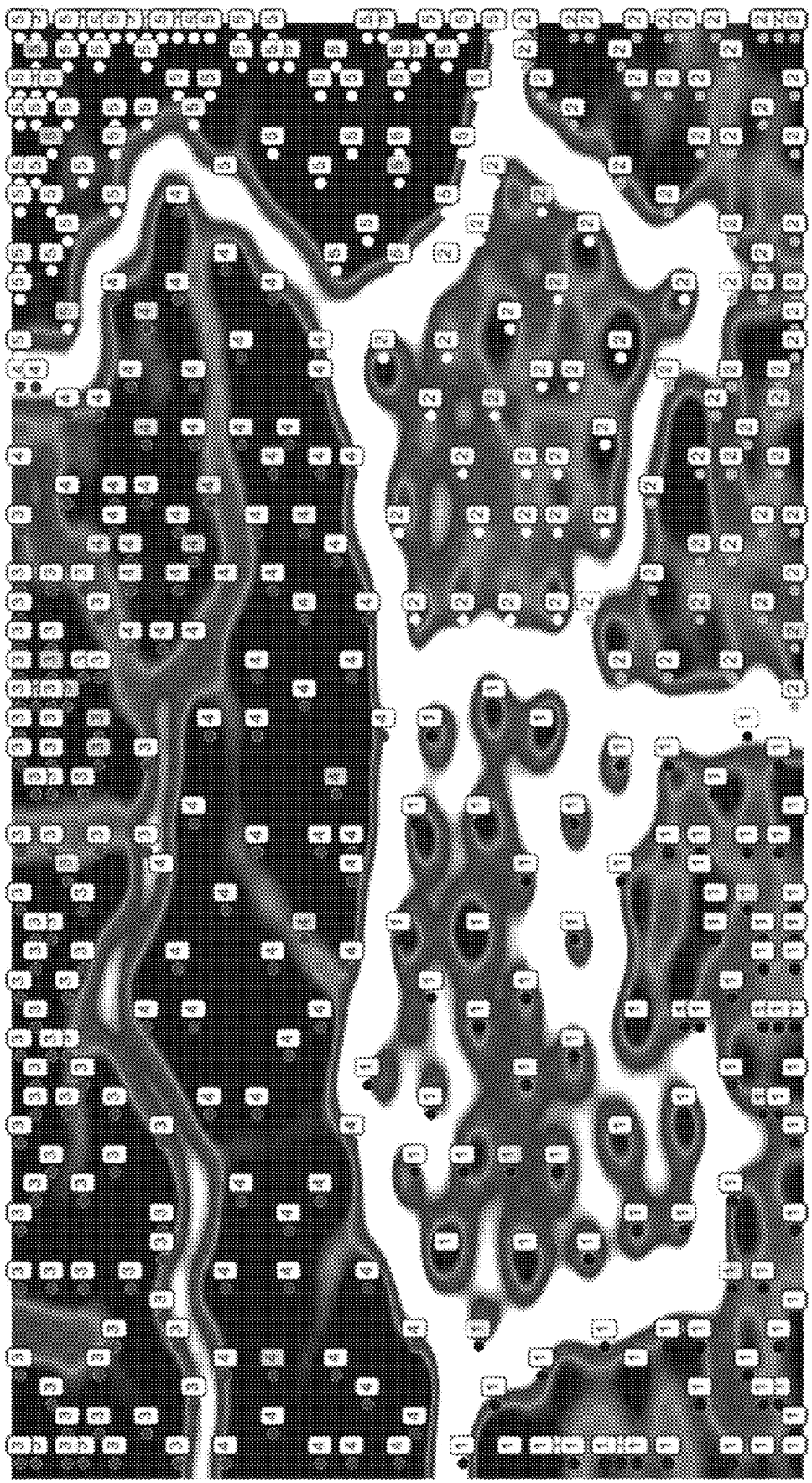
FIG. 8 depicts a U-matrix of 1800 compressed STC images, each of size 72×240×3, generated by the two-dimensional Self-Organizing Map (SOM) machine learning system of FIG. 7 from 1800 input STC images derived from synthetic sonic waveforms in a cased well employing a multiple string casing.

FIG. 8 shows a U-matrix of 1800 compressed STC images, each of size 72×240×3, generated by a SOM machine learning system from 1800 input STC images derived from synthetic sonic waveforms in a cased well employing a multiple string casing. The synthetic sonic waveforms were synthesized for five different pre-defined well integrity/cementing scenarios, i.e., (1) annulus A (inner annulus) is hard cement, annulus B (outer annulus) is hard cement; (2) annulus A is lite cement, annulus B is lite cement; (3) annulus A is water, annulus B is hard cement; (4) annulus A is water, annulus B is lite cement; (5) annulus A is water, annulus B is water. There are a few clear boundaries with lighter colors that separate the corresponding clusters with darker colors in the U-matrix. The BMUs of original 1800 input STC images are also marked on the corresponding positions of the U-matrix. In the meantime, both the ground-truth class labels of the input STC images and the automatically clustered class labels given the U-matrix are marked with numbers and dots, respectively. One can see that the clustering method based on the U-matrix of the SOM machine learning system is able to automatically separate the STC images synthesized from different cementing scenarios, though with some mislabeled results in some scenarios comparing with the ground-truth.

SOM with Auto-Encoder (SOM-AE)

The SOM machine learning system has only one layer of neural network and no hidden layer is included. Thanks to the rapid emergence of deep neural networks, many powerful machine learning algorithms have been developed. In order to incorporate the benefits of deep neural network, an auto-encoder (AE) can be used to work with the SOM machine learning system.

The AE uses a multiple layer neural network structure which has an input layer, an output layer having the same number of neurons as the input layer, and one or more hidden layers connecting them. Details of the AE is set forth in Y. Bengio, "Learning Deep Architectures for AI," Foundations and Trends in Machine Learning, vol. 2, no. 1, pp. 1-127, 2009. Since the training label is the training data itself, the AE is an unsupervised learning system. The AE includes two components, an encoder and decoder, which can be defined as two functions $\phi$ and $\psi$, respectively, $$\begin{cases} z = \phi(x) \\ \hat{x} = \psi(z) \end{cases}, \quad \text{Eqn. (11)}$$

where $x \in X$ is an input data from a high-dimensional space, $z \in Z$ is a compressed data by the encoder $\phi$, and $\hat{x} \in X$ is the output reconstructed data by the decoder $\psi$. In order to achieve data compression, the encoded data space Z has a much lower dimension of the input/output data space X, and hence the AE has a bottleneck topology.

The objective of the AE is to find the weights of the encoder and the decoder such that the $l_2$-norm loss function between the decoded outputs $\hat{x}$ and the original inputs x is minimized, $$\text{i.e., } \hat{\phi}, \hat{\psi} = \underset{\phi,\psi}{\operatorname{argmin}} \sum_x \|x - \psi(\phi(x))\|^2 / 2$$

Figure 9:
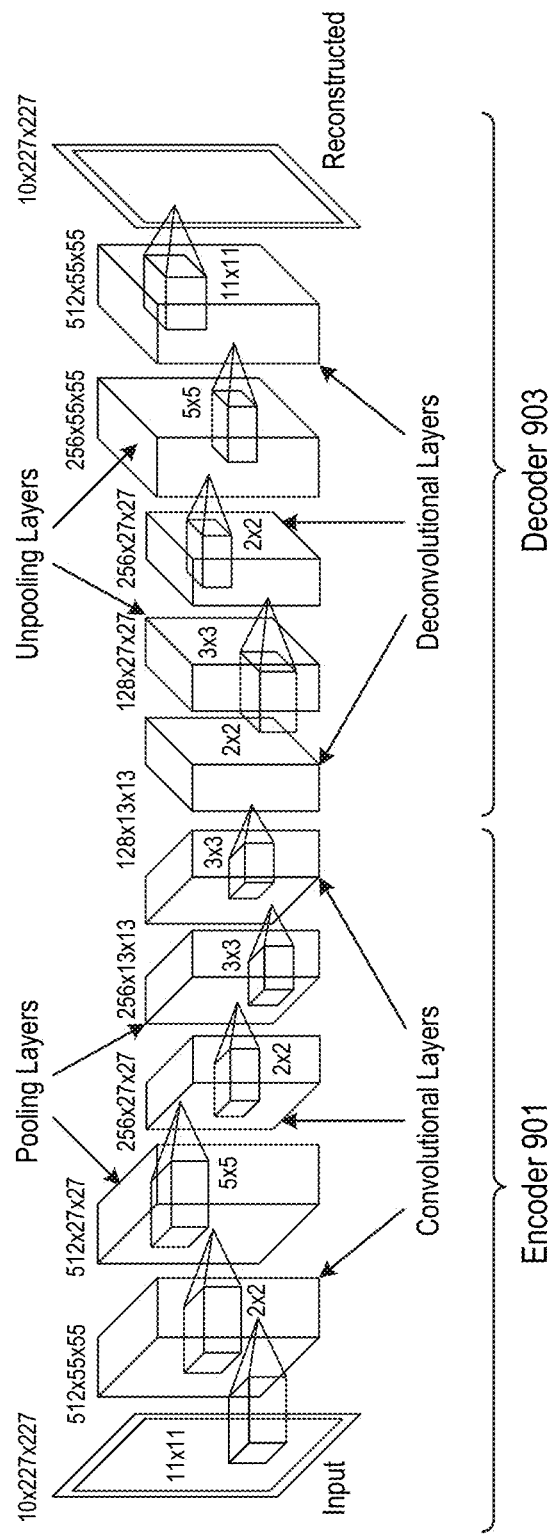
FIGS. 9 and 10 are schematic illustrations of an auto-encoder (AE) machine learning system, which can be used for sonic data compression as part of the workflow of FIG. 4.

Like other neural networks, backpropagation can be used to update the network weights of $\phi$, $\psi$ and gradually reduce the reconstruction error with stochastic gradient descent method and its variants. FIG. 9 shows a schematic structure of an AE with an encoder 901, a decoder 902, and the bottleneck structure at the end of the encoder 901.

In the SOM-AE machine learning system, the encoder of an AE is extended in front of the SOM machine learning system such that the input data to SOM machine learning system is no longer the original processed sonic data (e.g., TKO and STC results of the received sonic waveforms), but instead is a compressed representation of the processed sonic data produced by the encoder of the AE. There are many advantages for doing this. First, the SOM training process is usually slow especially for high-dimensional input; however, if we replace the high-dimensional input with the compressed intermediate-dimensional data produced by the encoder of the AE, then the SOM training process can be significantly accelerated. The training of AE can also be accelerated using GPU computing. Second, the encoder of the AE usually does not encode noncoherent random noise and hence can effectively attenuate the noise components of the input data. Thus, a SOM extended with the encoder of an AE before its input can therefore be more robust to the noisy input data. Third, we can fully exploit the power of deep neural networks and let them extend the learning capability of the SOM.

In a non-limiting example, the training steps of SOM-AE include: (1) Training an autoencoder (AE) model that includes an encoder and a decoder with input sonic data as training data using neural network structures and a stochastic gradient descent optimization method; (2) Applying an encoder module of the AE model to the original input sonic data to reduce its dimensionality; (3) Training a neural network of the self-organizing map (SOM) by feeding the dimensionality-reduced sonic data (the output of the AE encoder module) as its input; and (4) The trained SOM now accepts the output of the AE encoder module, i.e., the dimensionality-reduced sonic data as input and outputs the clustering results on a two-dimensional topology.

Figure 10:
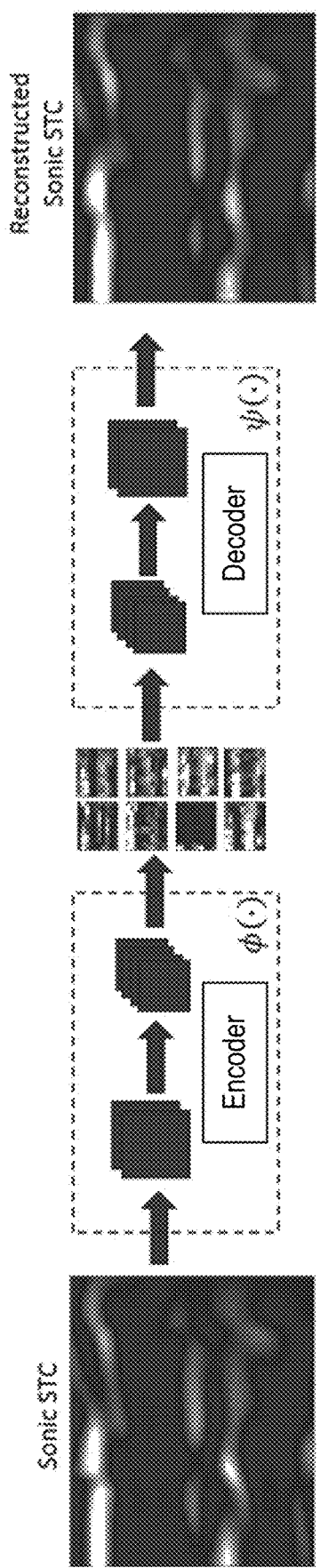

FIG. 10 shows the structure of an AE used for sonic STC image compression. Each input STC image is a data tensor of size 96×80×1.

Figure 11:
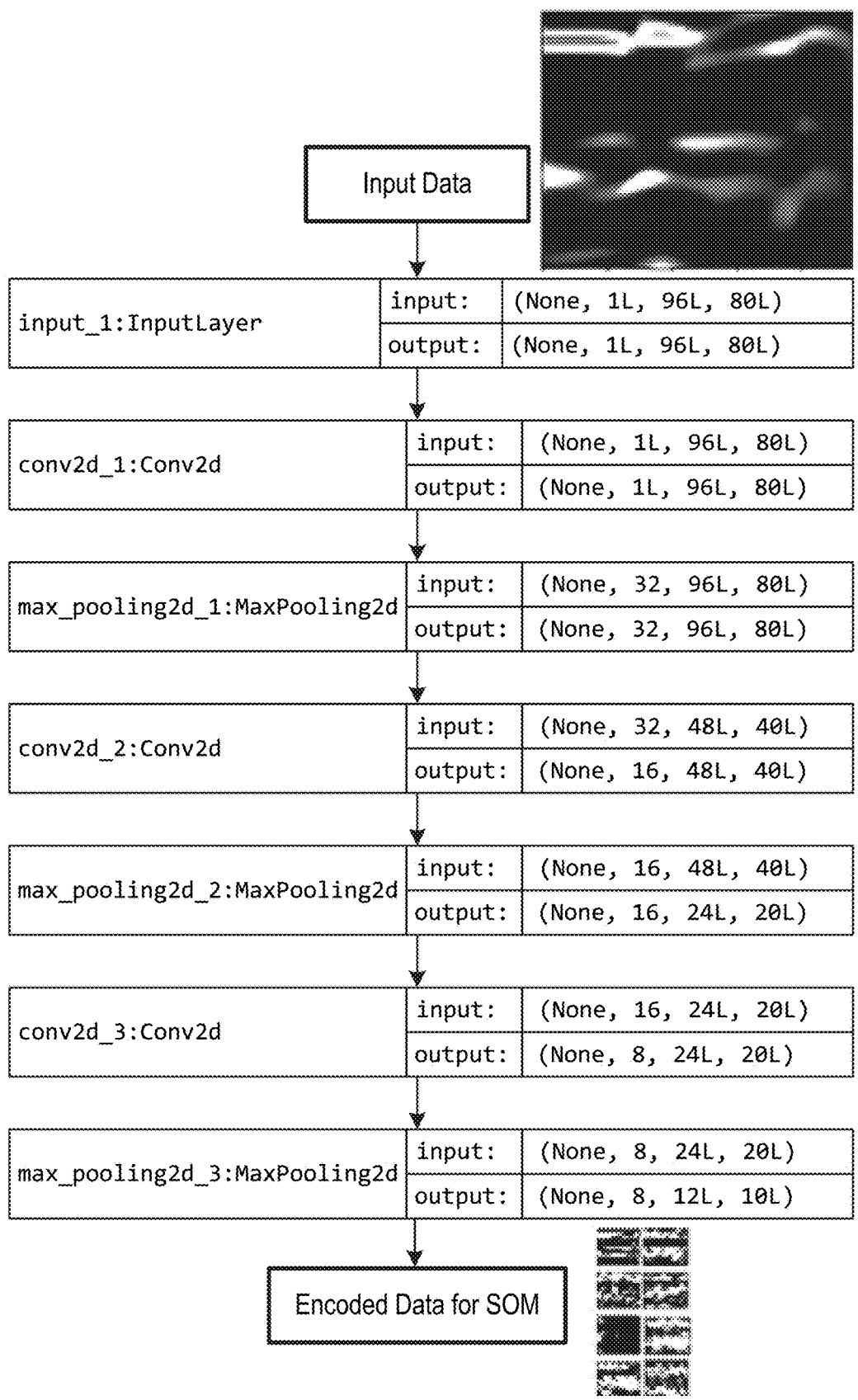
FIG. 11 is a diagram of the encoder structure of the AE machine learning system of FIGS. 9 and 10, which can be used for sonic data compression as part of the workflow of FIG. 4.

FIG. 11 shows the detailed structure of the encoder of the AE of FIG. 10, which comprises a plurality of convolutional neural networks and 2D maxpooling layers. At the output of the encoder of the AE, the compressed sonic STC image becomes a much smaller data tensor of size 12×10×8. At the right hand side of FIG. 10, one can see that the compressed sonic STC image is well reconstructed by the decoder of the AE, indicating that the encoder output has learned most of the information of the STC image. Hence, it is safe to replace the original 7680-dimensional STC image with the compressed 960-dimensional result produced by the encoder of the AE as the input to the SOM.

Figure 12:
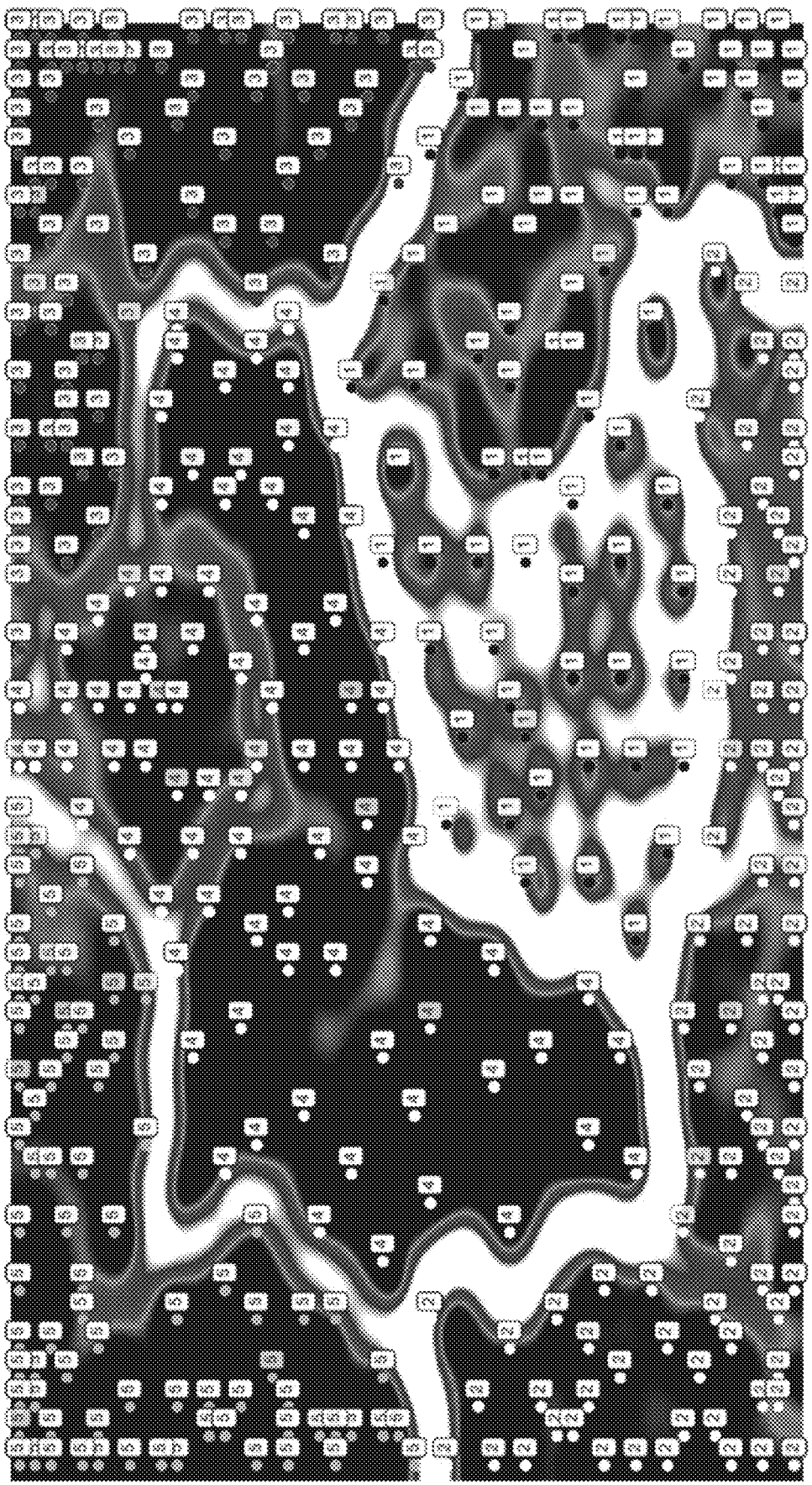
FIG. 12 depicts a U-matrix of 1800 compressed STC images, each of size 9×30×8, generated by the encoder structure of the AE machine learning system of FIG. 11 from original STC images of size 72×240×3. The original STC images were generated from synthetic sonic waveforms in a cased well employing a multiple string casing.

FIG. 12 shows the U-matrix of 1800 compressed STC images, each of size 9×30×8 (2160-dimension) generated by a SOM-AE machine learning system from STC images of size 72×240×3 (51840-dimension) derived from synthetic sonic waveforms in a cased well with a multiple string casing. Similar to FIG. 8, the synthetic sonic waveforms were synthesized for five different pre-defined well integrity/cementing scenarios, i.e., (1) annulus A (inner annulus) is hard cement, annulus B (outer annulus) is hard cement; (2) annulus A is lite cement, annulus B is lite cement; (3) annulus A is water, annulus B is hard cement. Given clustering classes in greyscale dots and the ground-truth classes in numbers, the SOM-AE machine learning system produces better clustering results in much shorter training time comparing to the SOM machine learning system.

Variational Auto-Encoder (VAE)

The AE machine learning system introduced above can compress high-dimensional input data to a low-dimensional representation with the encoder part of the AE. Such compressed information does not incorporate the distribution of the input data. Hence, high-dimensional data can be reconstructed from its low-dimensional representation, but new high-dimensional data cannot be generated from an arbitrary low-dimensional representation randomly sampled in the space.

On the contrary, a variational auto-encoder (VAE) machine learning system can learn the parameters of a probability distribution representing the input high-dimensional data, and therefore it can sample from the distribution to generate new high-dimensional data samples. Details of the VAE machine learning system are set forth in D. P. Kingma and M. Welling, "Auto-Encoding Variational Bayes," in The International Conference on Learning Representations (ICLR), Banff, Canada, 2014. As before, suppose that input data $x \in X$ belongs to a high-dimensional space. If we are able to model its probability distribution $p(x)$, then we can generate new data samples $x \notin X$ but resembling those in X. Since X is high-dimensional that is hard to model directly, we can set up a latent variable model instead:

$$p(x) = \int p(x|z) p(z) dz,  \qquad \text{Eqn. (12)}$$

where $z \in Z$ belongs to a disentangled low-dimensional latent variable space that can essentially represent X.

Calculating $p(x) = \int p(x|z) p(z) dz$ is computationally intractable as $p(x|z) \approx 0$ for most random z. In order to find those z that yields $p(x|z) >> 0$, it is reasonable to investigate $p(z|x)$ as those z extracted from x are more likely the latent variables under the data x. A method called variational inference can be used to infer the distribution $p(z|x)$ by approximating it with a simpler distribution $q(z|x)$ that is easy to evaluate, such as Gaussian distribution, and minimizing the difference between $p(z|x)$ and $q(z|x)$ using the KL divergence metric, which is in the form of:

$$D_{KL}[q(z|x) \| p(z|x)] = \sum_{z \sim q(z|x)} q(z|x) \log \frac{q(z|x)}{p(z|x)} = E_q\left[\log \frac{q(z|x)}{p(z|x)}\right]. \qquad \text{Eqn. (13)}$$

By using the Bayes' rule, the above Eqn. (13) can be rearranged as:

$$\log p(x) - D_{KL}[q(z|x) \| p(z|x)] = E_q[\log p(x|z)] - D_{KL}[q(z|x) \| p(z)]. \qquad \text{Eqn. (14)}$$

Note that the right-hand side of Eqn. (14) is the objective function of the VAE that is maximized. Since $D_{KL}[\cdot] \geq 0$, this function tries to find the maximum lower bound of $\log p(x)$, which is good enough in practice.

In the above VAE machine learning system, $p(x|z)$ generates a high-dimensional data x from its low-dimensional latent representation z, and $q(z|x)$ infers the low-dimensional latent representation z from a high-dimensional data x. Both processes can be constructed using deep neural networks, and based on the experiences of AE, $q(z|x)$ can be regarded as an encoder network whose output is a bottleneck while $p(x|z)$ can be regarded as a decoder network. The first part of the VAE objective function, $E_q[\log p(x|z)]$, represents the reconstruction likelihood which needs to be maximized and the second part, $D_{KL}[q(z|x) \| p(z)]$, denotes the difference between the approximated posterior distribution $q(z|x)$ and the prior distribution $p(z)$ which needs to be minimized. Maximizing the likelihood $E_q[\log p(x|z)]$ is equivalent to minimizing the regression loss function of a network under some optimal network weights. Minimizing $D_{KL}[q(z|x) \| p(z)]$ can be achieved by assuming both $q(z|x)$ and $p(z)$ follows Gaussian distributions such that $p(z) = \mathcal{N}(0; I)$, the standard Gaussian distribution, and $q(z|x) = \mathcal{N}(\mu_z|x; \sigma_z^2|x)$, where $\mu_z|x$, $\sigma_z^2|x$ are the mean and variance of $q(z|x)$ given the input data x, respectively. In such circumstance, $D_{KL}[q(z|x) \| p(z)]$ can be computed in a closed form as:

$$D_{KL}[q(z|x)\|p(z)] = D_{KL}[\mathcal{N}(\mu_z|x;\sigma_z^2|x)$$  Eqn. (15)

$$\|\mathcal{N}(0;1)] = \left[\sum_k (\sigma_z^2|x + \mu_z^2|x - 1 - \log\sigma_z^2|x)\right]/2.$$

Note that this term becomes the regularization term added to the regression loss function of the network where k is the dimension of the latent variable space. It is safe to assume the prior distribution $p(z) = \mathcal{N}(0;I)$ as a deep neural network is able to convert a simple Gaussian distribution to any arbitrarily complex distribution.

Figure 13A:
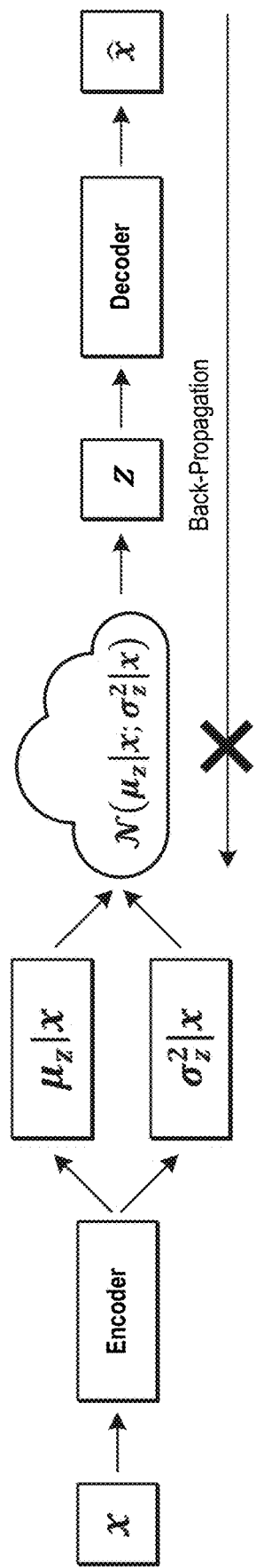
FIG. 13A is a diagram illustrating a naïve or incorrect implementation of a Variational Auto-Encoder (VAE) machine learning system.
Figure 13B:
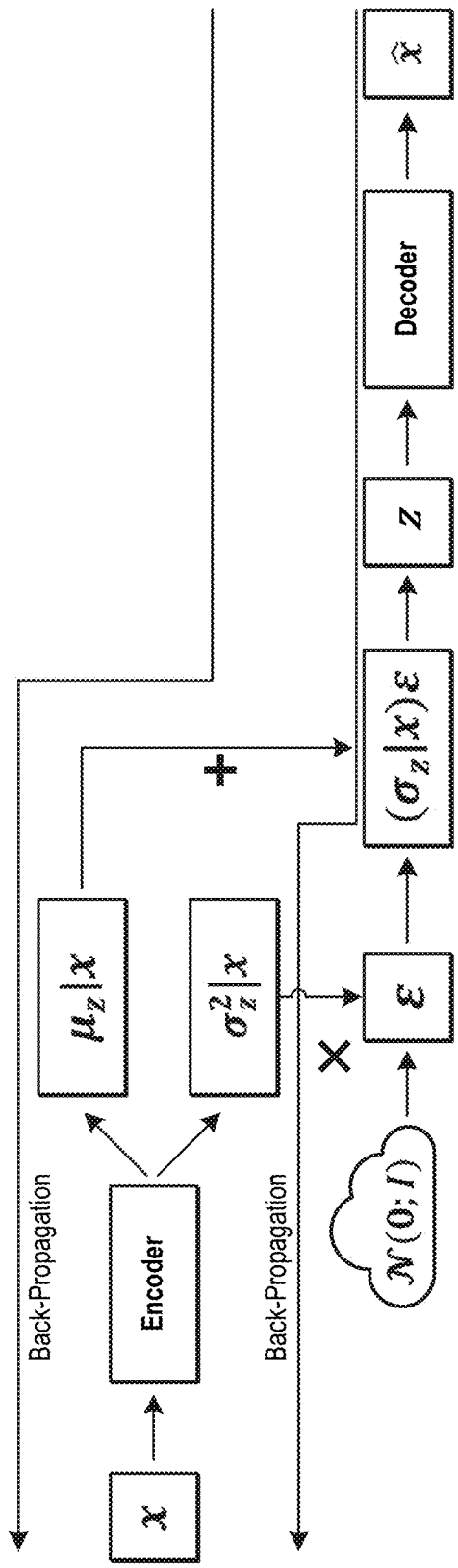
FIG. 13B is a diagram illustrating a correct implementation of a Variational Auto-encoder (VAE) machine learning system that uses reparameterization, which can be used for sonic data compression as part of the workflow of FIG. 4.

For the implementation, rather than directly providing the encoded values z as in a standard AE encoder, the VAE encoder provides the two latent variables $\mu_z|x, \sigma_z^2|x$ that describe the mean and variance of the latent space. The VAE decoder will then generate a new x by sampling a latent value z from its posterior distribution $\mathcal{N}(\mu_z|x;\sigma_z^2|x)$. However, such a plain implementation as shown in FIG. 13A does not work because the backpropagation used for network weight update cannot pass through the sampling process. Fortunately, such issue can be solved by using reparameterization which leaves the sampling process out of the network architecture. It suggests to randomly sample a variable e from a unit Gaussian variable and then scale it by the standard deviation of the latent space $\sigma_z|x$ and shift it by the mean of the latent space $\mu_z|x$. Such correct implementation with reparameterization is shown in FIG. 13B, where there is no obstacle in the backpropagation routes.

The high-dimensional processed sonic data (such as TKO data and STC image data) can be used to train the VAE and obtain the low-dimensional representation distributions produced by the encoder part of the VAE for visualization. In order to visualize the clustering results of low, but still larger than 3, dimensional representations, the t-distributed stochastic neighbor embedding (t-SNE) technique can be used. Details of the t-SNE technique is set forth in L. van der Maaten and G. Hinton, "Visualizing Data using t-SNE," Journal of Machine Learning Research, vol. November, no. 9, p. 2579-2605, 2008.

Figure 14A:
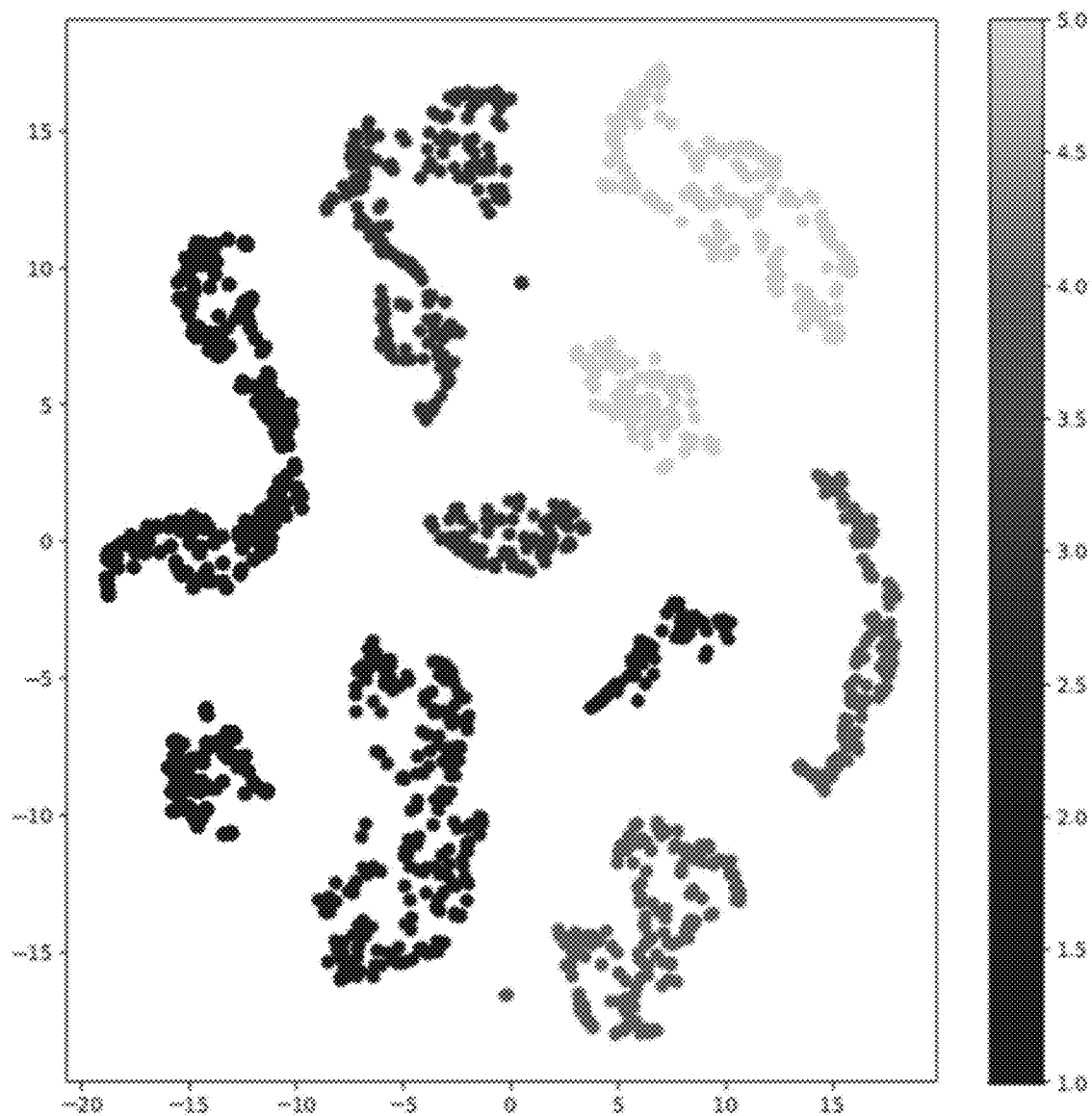
FIG. 14A is a plot of a t-SNE visualization of 16-dimension output produced by the encoder part of the VAE machine learning system of FIG. 13B where TKO data derived from monopole sonic waveforms is used as input to the VAE machine learning system.
Figure 14B:
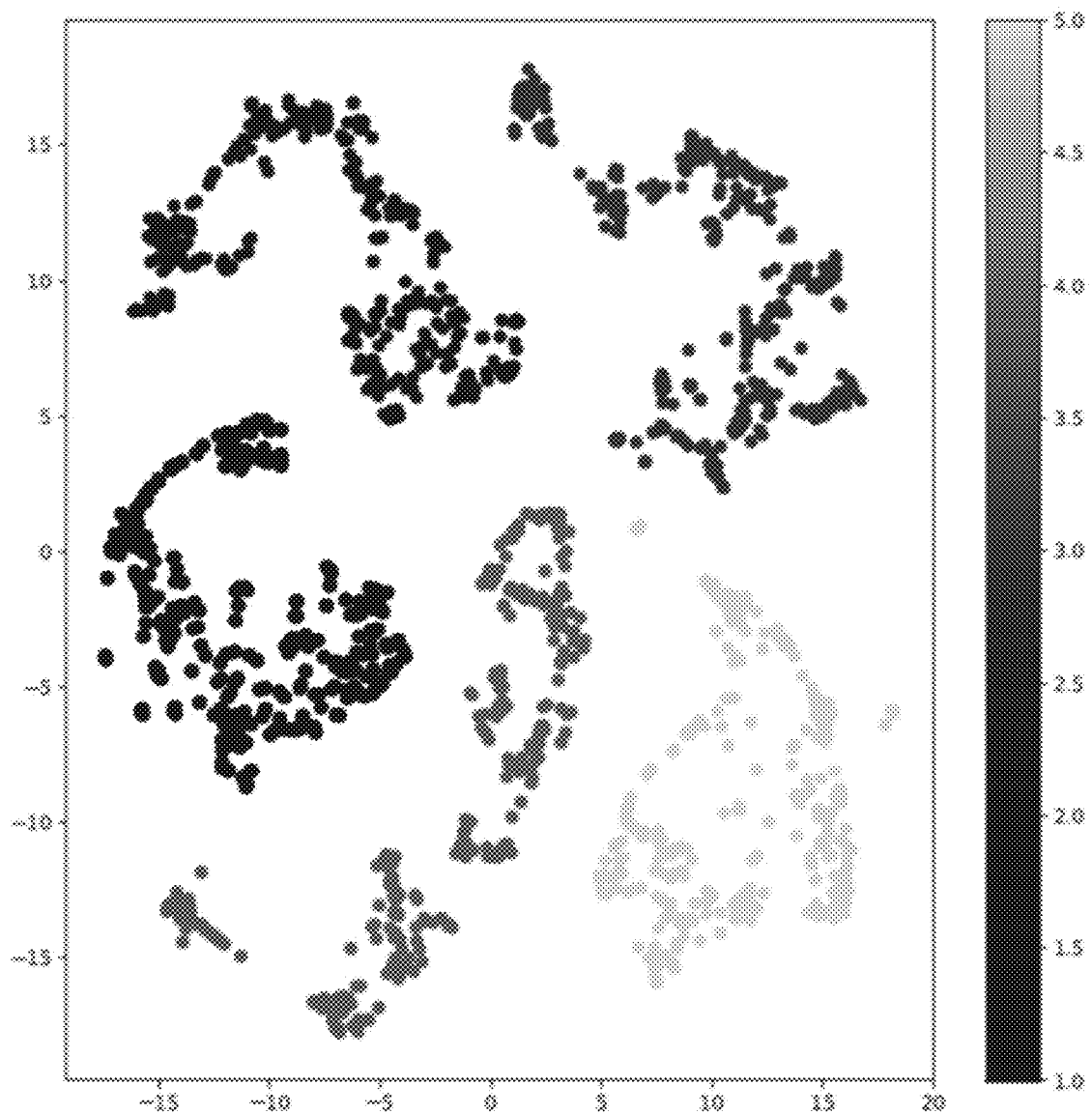
FIG. 14B is a plot of a t-SNE visualization of 16-dimension output produced by the encoder part of the VAE machine learning system of FIG. 13B where TKO data derived from dipole sonic waveforms is used as input to the VAE machine learning system.
Figure 14C:
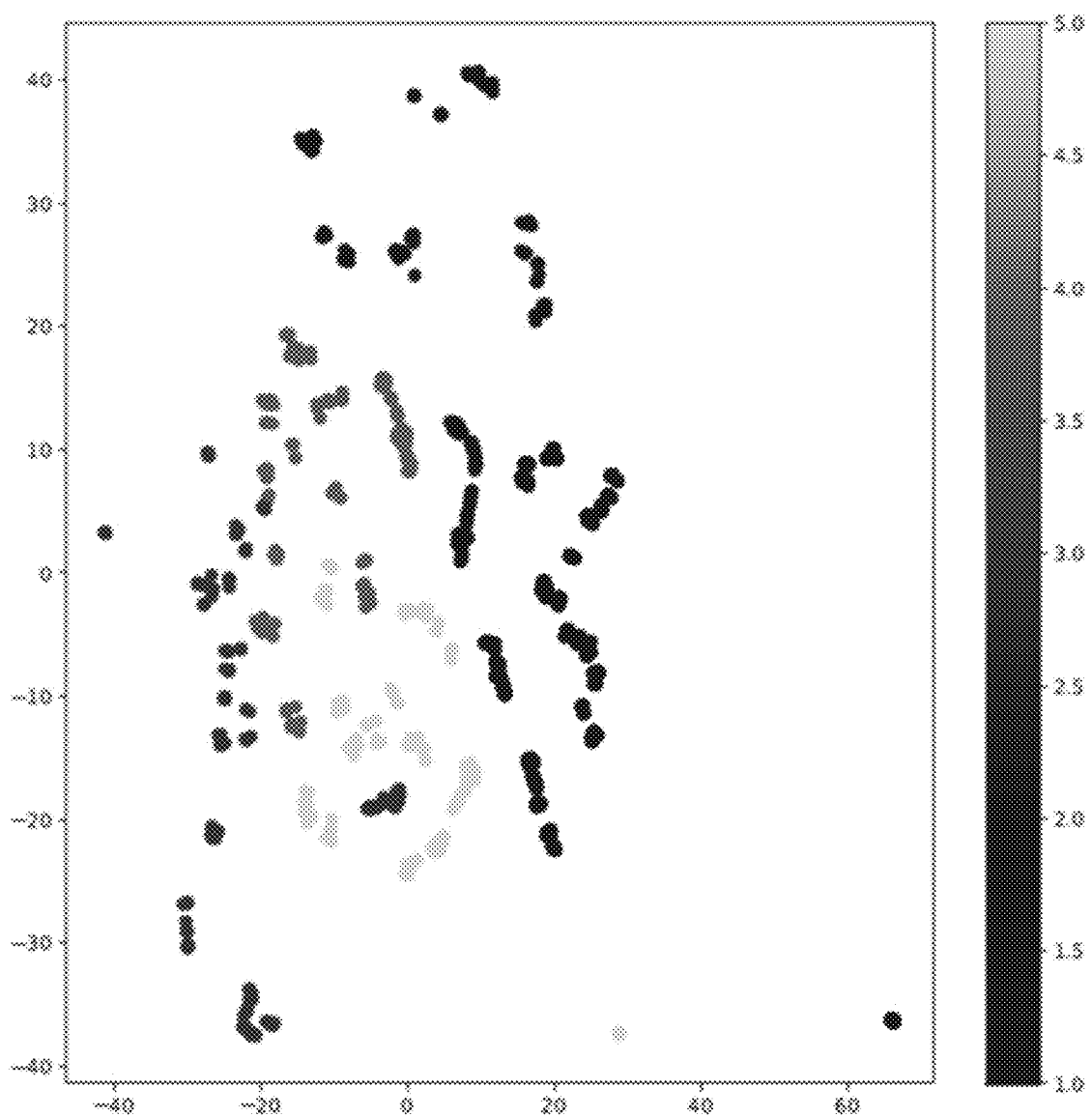
FIG. 14C is a plot of a t-SNE visualization of 16-dimension output produced by the encoder part of the VAE machine learning system of FIG. 13B where STC image data derived from monopole sonic waveforms is used as input to the VAE machine learning system.
Figure 14D:
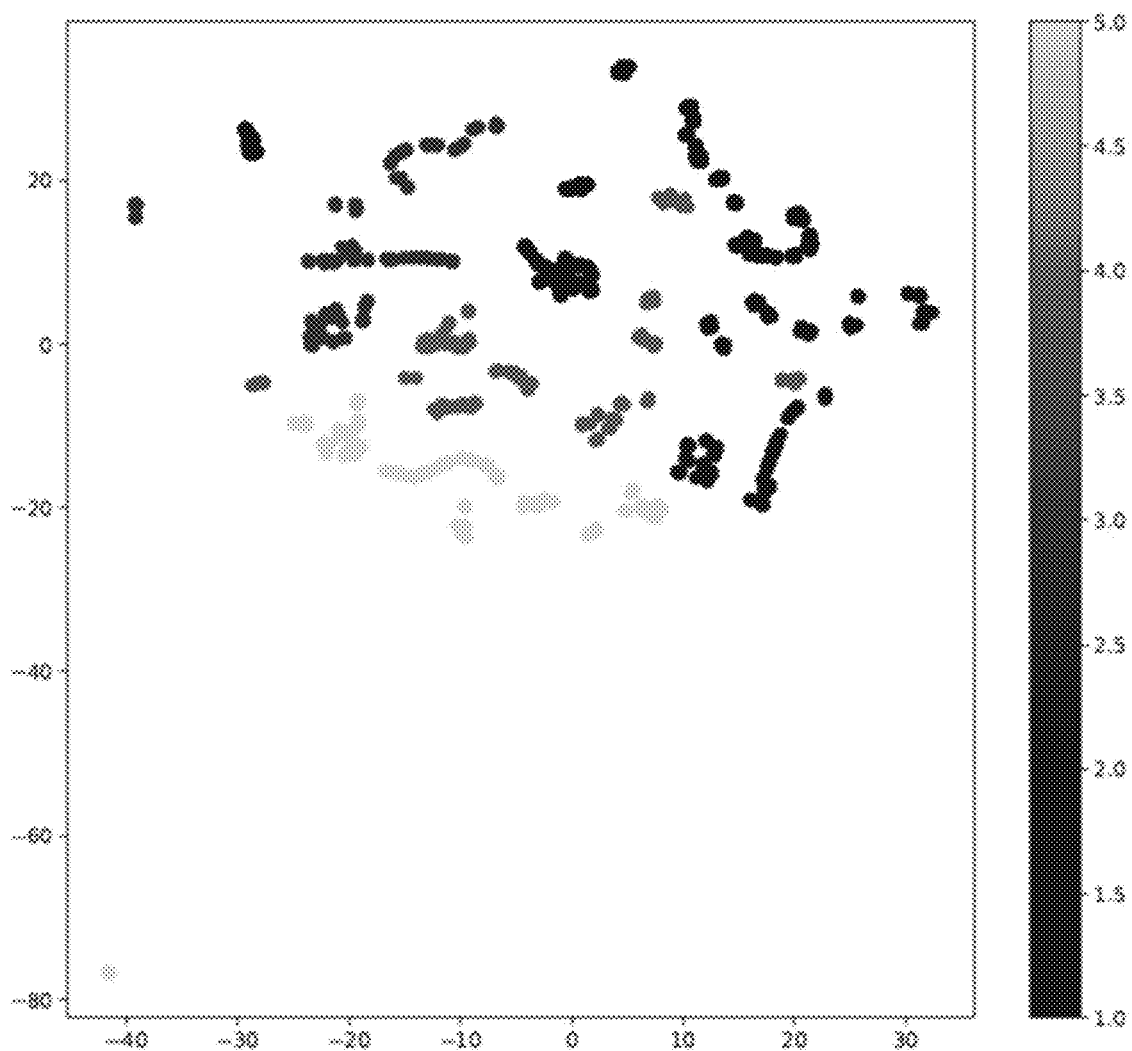
FIG. 14D is a plot of a t-SNE visualization of 16-dimension output produced by the encoder part of the VAE machine learning system of FIG. 13B where STC image data derived from dipole sonic waveforms is used as input to the VAE machine learning system.

FIGS. 14A-14D depict t-SNE visualizations of 16-dimension VAE outputs derived from high dimension TKO data or STC sonic data based on 1800 monopole and dipole sonic waveforms generated by numerical modeling. FIG. 14A is a plot of a t-SNE visualization of 16-dimension output produced by the encoder part of the VAE machine learning system of FIG. 13B where 1480-dimension processed TKO data derived from 1800 different monopole sonic waveforms is used as input to the VAE machine learning system (in 1800 different iterations for the 1800 different monopole sonic waveforms). FIG. 14B is a plot of a t-SNE visualization of 16-dimension output produced by the encoder part of the VAE machine learning system of FIG. 13B where 1480-dimension processed TKO data derived from 1800 different dipole sonic waveforms is used as input to the VAE machine learning system (in 1800 different iterations for the 1800 different dipole sonic waveforms). FIG. 14C is a plot of a t-SNE visualization of 16-dimension output produced by the encoder part of the VAE machine learning system of FIG. 13B where 34560-dimension processed STC data derived from 1800 monopole sonic waveforms is used as input to the VAE machine learning system (in 1800 different iterations for the 1800 different monopole sonic waveforms). FIG. 14D is a plot of a t-SNE visualization of 16-dimension output produced by the encoder part of the VAE machine learning system of FIG. 13B where 5180-dimension processed STC data derived from 1800 dipole sonic waveforms is used as input to the VAE machine learning system (in 1800 different iterations for 1800 different dipole sonic waveforms). As before, for each one of FIGS. 14A-14D, the 1800 sonic waveforms used for the processing were synthesized for five distinctive cementing scenarios for a cased well employing a multiple string casing, with 360 consecutive waveforms per scenario.

Figures 15A, 15B, 15C, 15D:
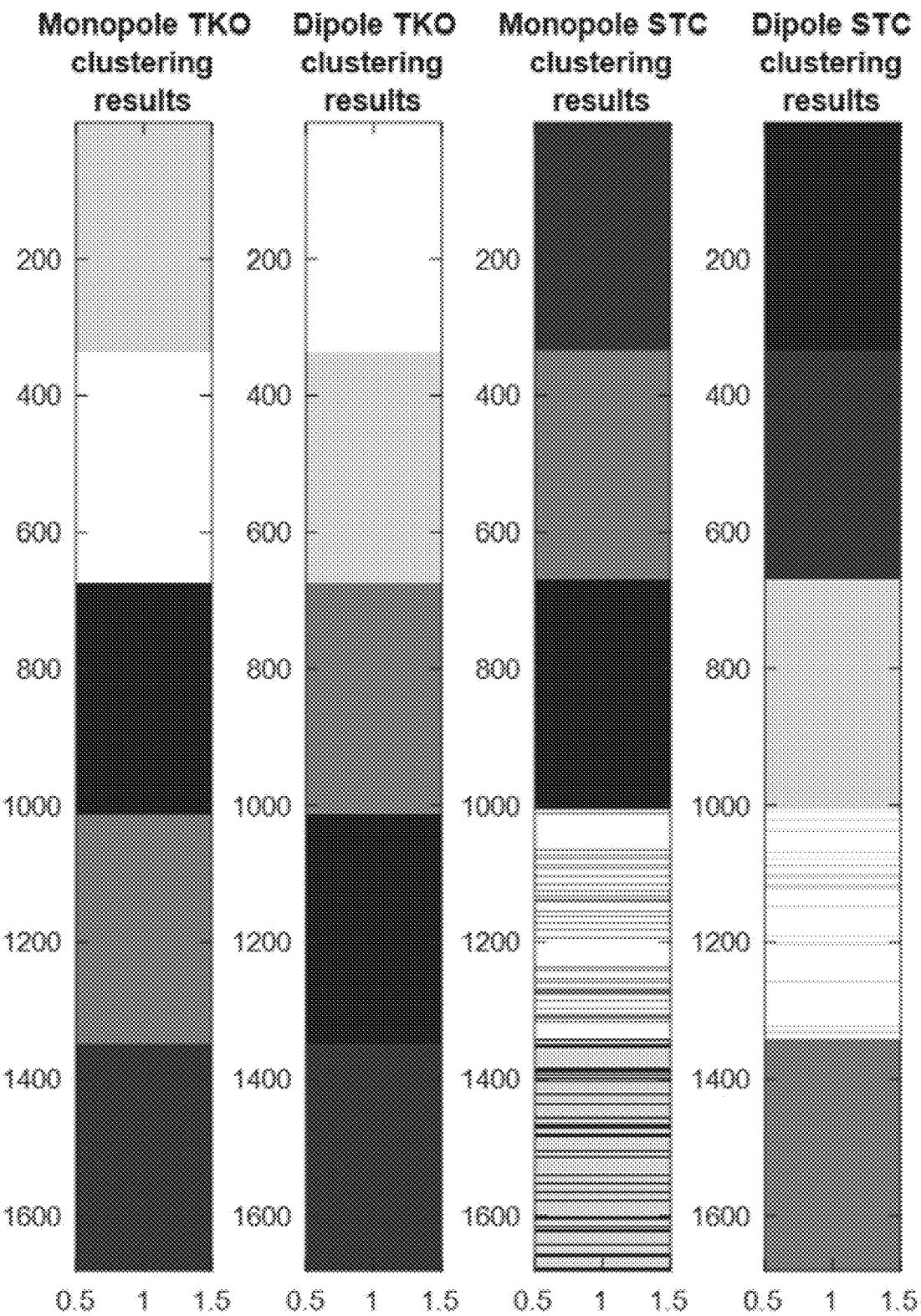
FIG. 15A is a vertical bar plot of the results of the t-SNE visualization and clustering shown in FIG. 14A.
FIG. 15B is a vertical bar plot of the results of the t-SNE visualization and clustering shown in FIG. 14B.
FIG. 15C is a vertical bar plot of the results of the t-SNE visualization and clustering shown in FIG. 14C.
FIG. 15D is a vertical bar plot of the results of the t-SNE visualization and clustering shown in FIG. 14D.

The results of the t-SNE plots of FIGS. 14A-14D can be formatted in vertical bar plots as shown in FIGS. 15A-15D where each row is depicted by a class label. FIG. 15A is a vertical bar plot of the results of the t-SNE visualization and clustering shown in FIG. 14A. FIG. 15B is a vertical bar plot of the results of the t-SNE visualization and clustering shown in FIG. 14B. FIG. 15C is a vertical bar plot of the results of the t-SNE visualization and clustering shown in FIG. 14C. FIG. 15D is a vertical bar plot of the results of the t-SNE visualization and clustering shown in FIG. 14D. The clustering results given the low-dimensional VAE outputs are plotted as vertical bars in FIGS. 15A-15D, indicating that the VAE machine learning system has a good clustering capability.

Since the VAE machine learning system employs a generative model after it learns the distribution of $q(z|x) = \mathcal{N}(\mu_z|x;\sigma_z^2|x)$, the VAE machine learning system can generate new high-dimensional samples x by drawing a sample $z \sim p(z) = \mathcal{N}(0;I)$ and pass z to the decoder p(x|z).

Figure 16:
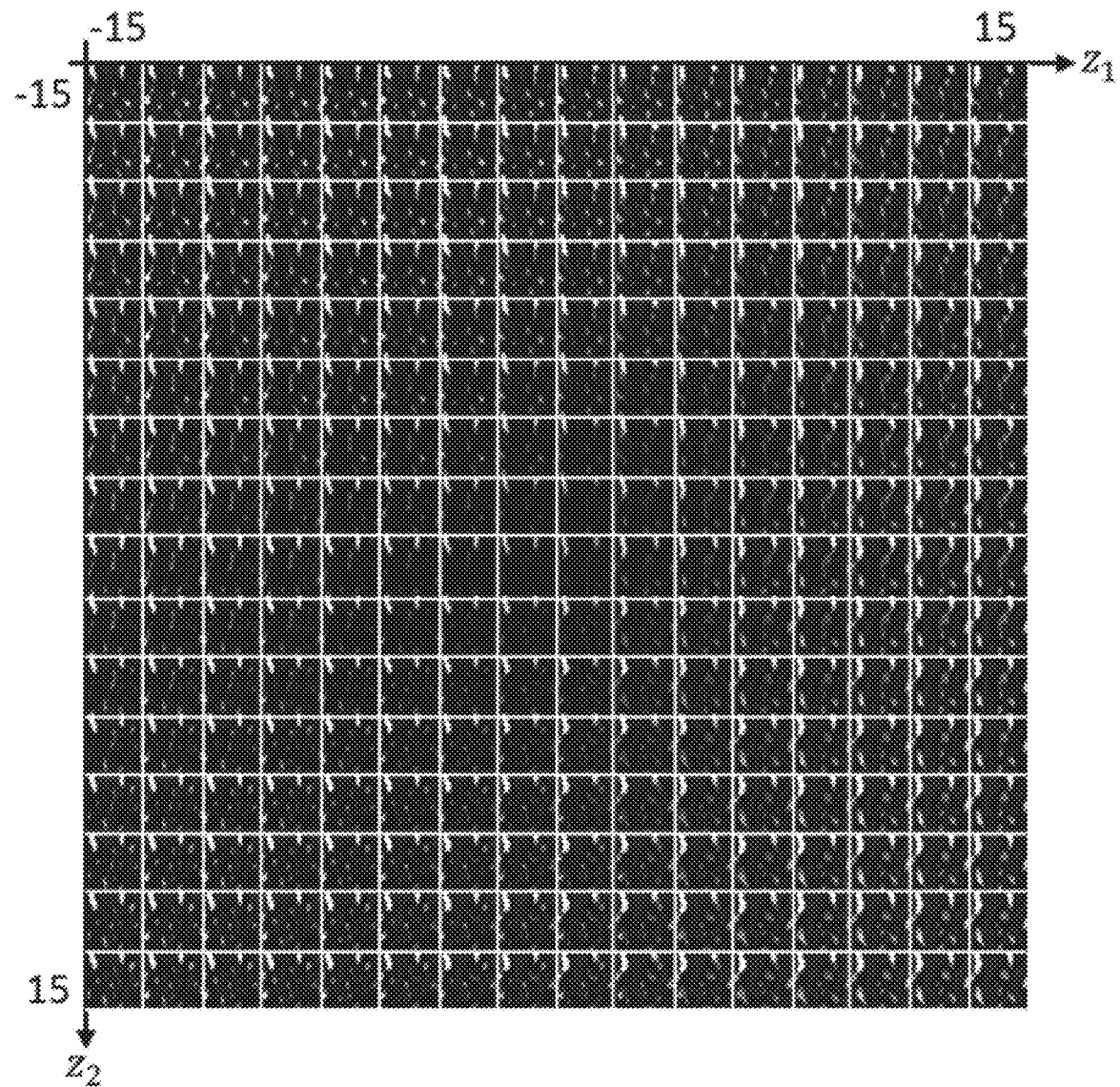
FIG. 16 depicts compressed (low-dimension) STC images produced by the encoder part of the VAE machine learning system of FIG. 13B; in producing these compressed STC images, the VAE machine learning system was trained by STC images of size 101×86 (8686-dimension) to generate new similar STC images by decoding from 128-dimensional latent variables z.

FIG. 16 shows an example of using a VAE machine learning system trained by STC images of size 101×86 (8686-dimension) to generate new similar STC images by decoding from the 128-dimensional latent variables z. In the example, $z_1$ and $z_2$ are swept from −15 to 15 and $z_3$ to $z_{128}$ are fixed as 0. The generated STC images decoded from the sampled latent variables z can be plotted at the corresponding grid $(z_1, z_2)$ as shown in FIG. 16.

Clustering Method

As described above, one or more clustering methods can be applied to the compressed (low-dimensional) sonic data produced by the unsupervised machine learning system to determine clusters in the compressed (low-dimensional) data set, and such clustering operations can be part of block 409 of FIG. 4.

In embodiments, the clustering method can possibly employ k-means clustering. In k-means clustering, the compressed (low-dimensional) data set is partitioned into k sets or clusters $S = \{S_1, S_2, \ldots, S_k\}$ so as to minimize the within-cluster sum of squares. Formally, the objective is to find:

$$\operatorname*{argmin}_s \sum_{i=1}^k \sum_{x \in S_i} \|x - \mu_i\|^2 = \operatorname*{argmin}_s \sum_{i=1}^k |S_i| \operatorname{Var} S_i$$  Eqn. (16)

where $\mu_i$ is the mean of points in a given cluster $S_i$. This is equivalent to minimizing the pairwise squared deviations of points in the same cluster.

Additionally or alternatively, the clustering method can possibly employ agglomerative clustering where the compressed (low-dimensional) data set starts with an initial set of clusters and pairs of clusters are selectively merged together based on analysis. The analysis can selectively decide which cluster pairs should be combined using a measure of dissimilarity between the clusters, which is often provided by a measure of distance between pairs of data elements and a linkage criterion which specifies the dissimilarity of clusters as a function of the pairwise distances of data elements in the clusters.

Additionally or alternatively, the clustering method can possibly employ other forms of hierarchical clustering (such as divisive clustering) or other forms of clustering as desired.

In embodiments, some or all of the methods and processes described above, including some or all of the operations of blocks 401-415 of the workflow of FIG. 4, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the processor. In embodiments, the machine learning systems and supporting methods as described herein can be embodied by computer program logic. The computer program logic may be embodied in software modules of various forms, including a source code form or a computer executable form. Source code may include a series of computer program instructions in a variety of programming languages (e.g., an object code, an assembly language, or a high-level language such as C, C++, or JAVA). The computer program logic can be stored in a non-transitory computer readable medium (e.g., memory) and executed by the processor. The computer program logic may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Additionally or alternatively, the processor may include discrete electronic components coupled to a printed circuit board, integrated circuitry (e.g., a CPU, a Domain Specific Integrated Circuit such as AI chip, or an Application Specific Integrated Circuit (ASIC)), and/or programmable logic devices (e.g., a Field Programmable Gate Arrays (FPGA)). Any of the methods and processes described above can be implemented using such logic devices.

Figure 17:
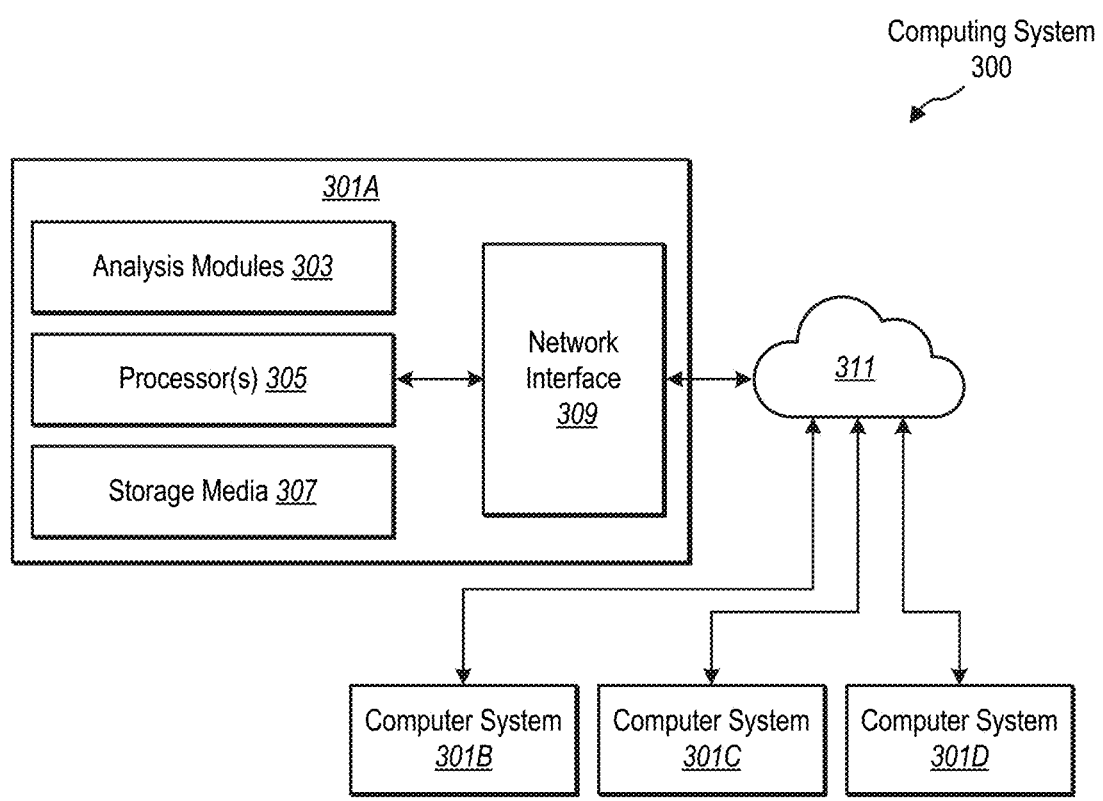
FIG. 17 is a schematic diagram of a computer system that can be used to implement the methods and systems described herein.

FIG. 17 shows an example computer system 300 that can be used to implement some or all of the methods and processes described above, including some or all of the operations of blocks 401-415 of the workflow of FIG. 4. The computer system 300 can be an individual computer system 301A or an arrangement of distributed computer systems. The computer system 301A includes one or more analysis modules 303 (a program of computer-executable instructions and associated data) that can be configured to perform some or all of the methods and processes described above, including some or all of the operations of blocks 401-415 of the workflow of FIG. 4. To perform these various methods and processes, an analysis module 303 executes on one or more computer processors 305, which is (or are) connected to one or more storage media 307. The computer processors(s) 305 is (or are) also connected to a network interface 309 to allow the computer system 301A to communicate over a data network 311 with one or more additional computer systems and/or computing systems, such as 301B, 301C, and/or 301D. Note that computer systems 301B, 301C and/or 301D may or may not share the same architecture as computer system 301A, and may be located in different physical locations.

The computer processor 305 can include at least a microprocessor, microcontroller, processor module or subsystem, programmable integrated circuit, programmable gate array, digital signal processor (DSP), or another control or computing device.

The storage media 307 can be implemented as one or more non-transitory computer-readable or machine-readable storage media. Note that while in the embodiment of FIG. 17, the storage media 307 is depicted as within computer system 301A, in some embodiments, storage media 307 may be distributed within and/or across multiple internal and/or external enclosures of computer system 301A and/or additional computing systems. Storage media 307 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) 303 can be provided on one computer-readable or machine-readable storage medium of the storage media 307, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computer system 300 is only one example of a computer system, and that computer system 300 may have more or fewer components than shown, may combine additional components not depicted in the embodiment of FIG. 17, and/or the computer system 300 may have a different configuration or arrangement of the components depicted in FIG. 17. The various components shown in FIG. 17 may be implemented in hardware, software, or a combination of both hardware and software, including one or more signal processing and/or application specific integrated circuits.

Although only a few examples have been described in detail above, those skilled in the art will readily appreciate that many modifications are possible in the examples without materially departing from this subject disclosure. For example, while a particular sonic logging tool has been disclosed, other sonic logging tools can be used as part of the methods and systems described herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A method for characterizing well integrity of a cased well, the method including:
   i) collecting sonic waveform data for acoustic signals received by a receiver array of a sonic logging tool for a depth interval of the cased well;
   ii) determining a high-dimensional representation of the sonic waveform data;
   iii) determining an intermediate-dimensional representation of the sonic waveform data from the high-dimensional representation of the sonic waveform data using a first unsupervised dimension-reduction machine learning model of a first type that compresses unlabeled high-dimensional sonic waveform data to an intermediate dimension latent variable space;
   iv) determining a low-dimensional representation of the sonic waveform data from the intermediate-dimensional representation of the sonic waveform data using a second unsupervised dimension-reduction machine learning model of a second type that compresses intermediate-dimensional sonic waveform data through a single-layer network architecture to a low-dimensional latent variable space;
   v) clustering the low-dimensional representation of the sonic waveform data to identify low-dimensional clusters and corresponding low-dimensional cluster labels directly from the low-dimensional representation of the sonic waveform data;
   vi) determining a cementing property based on a geophysical representation of the sonic waveform data at a receiver azimuth and depth of the sonic waveform data indicated by the low-dimensional cluster labels, wherein the cementing property is related to cementing integrity of an annulus of the cased well at the depth interval; and
   vii) determining a well integrity characterization of the cased well based on the cementing property.

2. The method of claim 1, wherein the well integrity characterization indicates to plug or abandon the cased well.

3. The method of claim 1, wherein the well integrity characterization indicates a competent pressure seal of the cased well at the depth interval.

4. The method of claim 1, wherein the low-dimensional representation of the sonic waveform data has a different distribution in the low-dimensional latent variable space than the high-dimensional representation of the sonic waveform data has in a high-dimensional latent variable space, and wherein the different distribution of the low-dimensional representation of the sonic waveform data yields different cluster labels after clustering than cluster labels resulting from clustering a distribution of the high-dimensional representation of the sonic waveform data.

5. The method of claim 1, wherein:
   the cementing property determined in vi) relates to well integrity as a function of azimuth and depth in the cased well.

6. The method of claim 5, wherein:
   the cementing property determined in vi) characterizes cement condition in an annulus of the cased well as a function of azimuth and depth.

7. The method of claim 1, wherein:
   the high-dimensional representation of ii) characterizes slowness in the sonic waveform data.

8. The method of claim 7, wherein:
   the high-dimensional representation of ii) characterizes at least one of: slowness over time in the sonic waveform data, slowness over frequency in the sonic waveform data, slowness over time and frequency in the sonic waveform data, or slowness over time and space in the sonic waveform data.

9. The method of claim 7, further comprising:
   using a matrix pencil (TKO) method to generate dispersion data representing a dispersion relation between slowness and frequency in the sonic waveform data, wherein the dispersion data is part of the high-dimensional representation of ii).

10. The method of claim 7, further comprising:
    using a slowness-time-coherence (STC) method to generate STC image data representing an STC image corresponding to the sonic waveform data, wherein the STC image data is part of the high-dimensional representation of ii).

11. The method of claim 1, wherein:
    the unsupervised dimension-reduction machine learning model is selected from the group consisting of a Self-Organizing Map (SOM) machine learning system, a SOM with Auto-Encoder (SOM-AE) machine learning system, a Variational Auto-Encoder (VAE) machine learning system, a Generative Adversarial Network (GAN) machine learning system, and combinations thereof.

12. The method of claim 1, wherein:
    the first unsupervised dimension-reduction machine learning model of the first type is trained with high-dimensional input data derived from simulated acoustic waveforms that cover and correspond to different cased well scenarios related to the cementing property determined in vi).

13. The method of claim 1, wherein:
    the first unsupervised dimension-reduction machine learning model of the first type is trained with high-dimensional input data derived from measured acoustic waveforms in different known cased well environments that cover and correspond to the cementing property determined in vi).

14. The method of claim 1, wherein:
    clustering includes employing k-means clustering.

15. The method of claim 1, wherein:
    clustering includes employing agglomerative clustering.

16. The method of claim 1, wherein:
    the cased well has a multiple string casing with an innermost annulus disposed inside at least one outer annulus; and
    the cementing property related to well integrity characterizes cement condition in the innermost annulus and the at least one outer annulus.

17. A system, comprising:
    at least one processor;
    memory in electronic communication with the at least one processor; and
    instructions stored in the memory, the instructions being executable by the at least one processor to:

collect sonic waveform data for acoustic signals received by a receiver array of a sonic logging tool for a depth interval of a cased well;

determine a high-dimensional representation of the sonic waveform data;

determine an intermediate-dimensional representation of the sonic waveform data from the high-dimensional representation of the sonic waveform data using a first unsupervised dimension-reduction machine learning model of a first type that compresses unlabeled high-dimensional sonic waveform data to an intermediate dimension latent variable space;

determine a low-dimensional representation of the sonic waveform data from the intermediate-dimensional representation of the sonic waveform data using a second unsupervised dimension-reduction machine learning model of a second type that compresses intermediate-dimensional sonic waveform data through a single-layer network architecture to a low-dimensional latent variable space;

cluster the low-dimensional representation of the sonic waveform data to identify low-dimensional clusters and corresponding low-dimensional cluster labels directly from the low-dimensional representation of the sonic waveform data;

determine a cementing property based on a geophysical representation of the sonic waveform data at a receiver azimuth and depth of the sonic waveform data indicated by the low-dimensional cluster labels, wherein the cementing property is related to integrity of an annulus of the cased well at the depth interval; and determine a well integrity characterization of the cased well based on the cementing property associated with the cased well.

18. The system of claim 17, wherein the first unsupervised dimension-reduction machine learning model of the first type is an auto-encoder type of unsupervised machine learning model and the second unsupervised dimension-reduction machine learning model of the second type is a Self-Organizing Map type of unsupervised machine learning model.

19. A non-transitory computer-readable storage medium including instructions that, when executed by at least one processor, cause the at least one processor to:

collect sonic waveform data for acoustic signals received by a receiver array of a sonic logging tool for a depth interval of a cased well;

determine a high-dimensional representation of the sonic waveform data;

determine an intermediate-dimensional representation of the sonic waveform data from the high-dimensional representation of the sonic waveform data using a first unsupervised dimension-reduction machine learning model of a first type that compresses unlabeled high-dimensional sonic waveform data to an intermediate dimension latent variable space;

determine a low-dimensional representation of the sonic waveform data from the intermediate-dimensional representation of the sonic waveform data using a second unsupervised dimension-reduction machine learning model that is trained based on synthetic high-dimensional sonic waveform data samples and of a second type that compresses intermediate-dimensional sonic waveform data through a single-layer network architecture to a low-dimensional latent variable space;

cluster the low-dimensional representation of the sonic waveform data to identify low-dimensional clusters and corresponding low-dimensional cluster labels directly from the low-dimensional representation of the sonic waveform data;

determine a cementing property based on a geophysical representation of the sonic waveform data at a receiver azimuth and depth of the sonic waveform data indicated by the low-dimensional cluster labels, wherein the cementing property is related to integrity of an annulus of the cased well at the depth interval; and determine a well integrity characterization of the cased well based on the cementing property.

* * * * *